US010919229B2

(12) United States Patent
Topolkaraev et al.

(10) Patent No.: US 10,919,229 B2
(45) Date of Patent: Feb. 16, 2021

(54) POLYMERIC MATERIAL FOR THREE-DIMENSIONAL PRINTING

(71) Applicant: Kimberly-Clark Worldwide, Inc., Neenah, WI (US)

(72) Inventors: Vasily A. Topolkaraev, Appleton, WI (US); Ryan J. McEneany, Appleton, WI (US); Neil T. Scholl, Neenah, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 347 days.

(21) Appl. No.: 14/909,754

(22) PCT Filed: Jul. 9, 2014

(86) PCT No.: PCT/IB2014/062976
§ 371 (c)(1),
(2) Date: Feb. 3, 2016

(87) PCT Pub. No.: WO2015/019212
PCT Pub. Date: Feb. 12, 2015

(65) Prior Publication Data
US 2016/0185050 A1 Jun. 30, 2016

Related U.S. Application Data

(60) Provisional application No. 61/863,944, filed on Aug. 9, 2013.

(51) Int. Cl.
*B29C 64/393* (2017.01)
*B29C 64/40* (2017.01)
(Continued)

(52) U.S. Cl.
CPC .............. *B29C 64/40* (2017.08); *B29C 64/10* (2017.08); *B29C 64/118* (2017.08);
(Continued)

(58) Field of Classification Search
CPC ........................... B29C 67/0092; B29C 64/40
See application file for complete search history.

(56) References Cited

U.S. PATENT DOCUMENTS

| 3,423,255 A | 1/1969 | Joyce |
| 3,802,817 A | 4/1974 | Matsuki et al. |

(Continued)

FOREIGN PATENT DOCUMENTS

| CN | 103146164 A | * 6/2013 |
| WO | WO 2012/109144 A1 | 8/2012 |
| WO | WO 2012/166546 | 12/2012 |

OTHER PUBLICATIONS

European Search Report dated Apr. 6, 2017, 9 pages.
(Continued)

*Primary Examiner* — Leith S Shafi
*Assistant Examiner* — Nicholas R Krasnow
(74) *Attorney, Agent, or Firm* — Dority & Manning, P.A.

(57) ABSTRACT

A polymeric material that is capable of being employed as a build material and/or support material in a three-dimensional printer system is provided. The polymeric material is formed from a thermoplastic composition containing a continuous phase that includes a matrix polymer. A microinclusion additive and nanoinclusion additive are dispersed within the continuous phase in the form of discrete domains.

16 Claims, 12 Drawing Sheets

(51) Int. Cl.

| | | |
|---|---|---|
| *B29C 64/321* | (2017.01) | |
| *B29C 64/10* | (2017.01) | |
| *B29C 64/30* | (2017.01) | |
| *B29C 64/118* | (2017.01) | |
| *B29C 64/307* | (2017.01) | |
| *B29C 64/255* | (2017.01) | |
| *B29C 64/343* | (2017.01) | |
| *B29C 64/259* | (2017.01) | |
| *B29C 64/329* | (2017.01) | |
| *B33Y 10/00* | (2015.01) | |
| *B33Y 30/00* | (2015.01) | |
| *B33Y 70/00* | (2020.01) | |
| *B29K 23/00* | (2006.01) | |
| *B29K 25/00* | (2006.01) | |
| *B29K 67/00* | (2006.01) | |
| *B29K 105/00* | (2006.01) | |
| *B29K 105/16* | (2006.01) | |

(52) U.S. Cl.
CPC .......... *B29C 64/255* (2017.08); *B29C 64/259* (2017.08); *B29C 64/30* (2017.08); *B29C 64/307* (2017.08); *B29C 64/321* (2017.08); *B29C 64/329* (2017.08); *B29C 64/343* (2017.08); *B29K 2023/06* (2013.01); *B29K 2023/12* (2013.01); *B29K 2025/08* (2013.01); *B29K 2067/046* (2013.01); *B29K 2105/0085* (2013.01); *B29K 2105/162* (2013.01); *B29K 2995/0077* (2013.01); *B33Y 10/00* (2014.12); *B33Y 30/00* (2014.12); *B33Y 70/00* (2014.12)

(56) References Cited

U.S. PATENT DOCUMENTS

| | | | |
|---|---|---|---|
| 3,855,046 A | 12/1974 | Hansen et al. | |
| 4,041,203 A | 8/1977 | Brock et al. | |
| 4,100,324 A | 7/1978 | Anderson et al. | |
| 4,282,735 A | 8/1981 | Break | |
| 4,374,888 A | 2/1983 | Bornslaeger | |
| 4,557,132 A | 12/1985 | Break | |
| 4,698,372 A | 10/1987 | Moss | |
| 4,741,944 A | 5/1988 | Jackson et al. | |
| 4,766,029 A | 8/1988 | Brock et al. | |
| 4,797,468 A | 1/1989 | De Vries | |
| 4,937,299 A | 6/1990 | Ewen et al. | |
| D315,990 S | 4/1991 | Blenke et al. | |
| 5,030,404 A | 7/1991 | Bonnebat et al. | |
| 5,169,706 A | 12/1992 | Collier, IV et al. | |
| 5,179,164 A | 1/1993 | Lausberg et al. | |
| 5,213,881 A | 5/1993 | Timmons et al. | |
| 5,218,071 A | 6/1993 | Tsutsui et al. | |
| 5,272,236 A | 12/1993 | Lai et al. | |
| 5,278,272 A | 1/1994 | Lai et al. | |
| 5,284,703 A | 2/1994 | Everhart et al. | |
| 5,322,728 A | 6/1994 | Davey et al. | |
| 5,350,624 A | 9/1994 | Georger et al. | |
| D358,035 S | 5/1995 | Zander et al. | |
| 5,464,688 A | 11/1995 | Timmons et al. | |
| 5,470,944 A | 11/1995 | Bonsignore | |
| 5,472,775 A | 12/1995 | Obijeski et al. | |
| 5,503,785 A | 4/1996 | Crump et al. | |
| 5,539,056 A | 7/1996 | Yang et al. | |
| 5,540,332 A | 7/1996 | Kopacz et al. | |
| 5,571,619 A | 11/1996 | McAlpin et al. | |
| 5,596,052 A | 1/1997 | Resconi et al. | |
| 5,620,779 A | 4/1997 | Levy et al. | |
| 5,667,635 A | 9/1997 | Win et al. | |
| D384,508 S | 10/1997 | Zander et al. | |
| D384,819 S | 10/1997 | Zander et al. | |
| D390,708 S | 2/1998 | Brown | |
| 5,764,521 A | 6/1998 | Batchelder et al. | |
| 5,770,682 A | 6/1998 | Ohara et al. | |
| 5,814,673 A | 9/1998 | Khait | |
| 5,821,327 A | 10/1998 | Oota et al. | |
| 5,880,254 A | 3/1999 | Ohara et al. | |
| 5,888,524 A | 3/1999 | Cole | |
| 5,962,112 A | 10/1999 | Haynes et al. | |
| 6,004,124 A | 12/1999 | Swanson et al. | |
| D418,305 S | 1/2000 | Zander et al. | |
| 6,028,018 A | 2/2000 | Amundson et al. | |
| 6,065,476 A * | 5/2000 | Agrawal ................ | A61L 27/50 128/898 |
| 6,070,107 A | 5/2000 | Lombardi et al. | |
| D428,267 S | 7/2000 | Romano, III et al. | |
| 6,090,325 A | 7/2000 | Wheat et al. | |
| 6,093,665 A | 7/2000 | Sayovitz et al. | |
| 6,214,933 B1 | 4/2001 | Wang et al. | |
| 6,228,923 B1 | 5/2001 | Lombardi et al. | |
| 6,326,458 B1 | 12/2001 | Gruber et al. | |
| 6,337,198 B1 | 1/2002 | Levene et al. | |
| 6,389,864 B1 | 5/2002 | Chubb et al. | |
| 6,431,477 B1 | 8/2002 | Pallmann | |
| 6,440,437 B1 | 8/2002 | Krzysik et al. | |
| 6,479,003 B1 | 11/2002 | Furgiuele et al. | |
| 6,494,390 B1 | 12/2002 | Khait et al. | |
| 6,500,563 B1 | 12/2002 | Datta et al. | |
| 6,582,810 B2 | 6/2003 | Heffelfinger | |
| 6,790,403 B1 | 9/2004 | Priedeman, Jr. et al. | |
| 6,818,173 B1 | 11/2004 | Khait | |
| 6,923,634 B2 * | 8/2005 | Swanson ................ | B29C 64/40 425/169 |
| 7,097,904 B2 | 8/2006 | Ochi et al. | |
| 7,122,246 B2 * | 10/2006 | Comb ..................... | B29C 64/20 428/364 |
| 7,223,359 B2 | 5/2007 | Torkelson et al. | |
| 7,445,735 B2 | 11/2008 | Miller et al. | |
| 7,510,133 B2 | 3/2009 | Pallmann | |
| 7,604,470 B2 | 10/2009 | LaBossiere et al. | |
| 7,625,200 B2 | 12/2009 | Leavitt | |
| 7,754,807 B2 | 7/2010 | Priedeman, Jr. et al. | |
| 7,891,964 B2 | 2/2011 | Skubic et al. | |
| 7,910,041 B1 | 3/2011 | Priedeman, Jr. | |
| 7,914,891 B2 | 3/2011 | Amundson et al. | |
| 7,938,351 B2 * | 5/2011 | Taatjes ................ | B65H 49/322 242/171 |
| 7,938,356 B2 * | 5/2011 | Taatjes ................ | B65H 75/28 242/125.3 |
| 8,334,327 B2 | 12/2012 | Kaufman et al. | |
| 8,394,306 B2 | 3/2013 | Nishida et al. | |
| 8,404,171 B2 | 3/2013 | Heenan | |
| 8,512,024 B2 | 8/2013 | Pax | |
| 8,684,739 B2 | 4/2014 | Steffier et al. | |
| 8,695,811 B2 | 4/2014 | Kang et al. | |
| 8,697,117 B2 * | 4/2014 | Zilberman ............ | A61L 15/44 424/443 |
| 8,759,446 B2 | 6/2014 | Li et al. | |
| 8,877,246 B2 * | 11/2014 | Everland .............. | A61P 19/08 424/489 |
| 8,920,697 B2 | 12/2014 | Mikulak et al. | |
| 8,936,740 B2 | 1/2015 | Topolkaraev et al. | |
| 9,764,316 B2 * | 9/2017 | Kharlampieva ...... | C09C 1/3676 |
| 2001/0030383 A1 * | 10/2001 | Swanson .............. | B29C 64/40 264/308 |
| 2002/0122828 A1 | 9/2002 | Liu | |
| 2003/0113528 A1 | 6/2003 | Moya | |
| 2003/0153457 A1 * | 8/2003 | Nemoto ................. | B01J 20/262 502/402 |
| 2004/0002273 A1 | 1/2004 | Fitting et al. | |
| 2004/0192794 A1 | 9/2004 | Patterson et al. | |
| 2004/0258731 A1 * | 12/2004 | Shimoboji ............ | A61K 9/70 424/426 |
| 2006/0002978 A1 * | 1/2006 | Shea ..................... | A61K 38/18 424/426 |
| 2006/0088567 A1 * | 4/2006 | Warner .................. | A61L 31/16 424/422 |
| 2010/0096485 A1 * | 4/2010 | Taatjes ................ | B65H 49/322 242/171 |
| 2010/0152317 A1 * | 6/2010 | Aizawa ................ | A61L 27/425 523/115 |
| 2010/0322908 A1 * | 12/2010 | Everland .............. | A61L 27/56 424/93.7 |

(56) References Cited

U.S. PATENT DOCUMENTS

| | | | |
|---|---|---|---|
| 2011/0060445 A1* | 3/2011 | Heenan | B29C 64/106 |
| | | | 264/255 |
| 2011/0064784 A1* | 3/2011 | Mullens | B22F 3/1121 |
| | | | 424/443 |
| 2011/0212179 A1 | 9/2011 | Liu | |
| 2012/0027833 A1* | 2/2012 | Zilberman | A61K 31/546 |
| | | | 424/422 |
| 2012/0040185 A1 | 2/2012 | Topolkaraev et al. | |
| 2012/0040582 A1* | 2/2012 | Topolkaraev | D01D 5/38 |
| | | | 442/334 |
| 2012/0136088 A1* | 5/2012 | Aizawa | A61L 27/425 |
| | | | 523/115 |
| 2012/0164905 A1 | 6/2012 | Topolkaraev et al. | |
| 2012/0231242 A1 | 9/2012 | Boyer et al. | |
| 2012/0258190 A1 | 10/2012 | Batchelder et al. | |
| 2013/0137788 A1* | 5/2013 | Yamamura | C08L 67/04 |
| | | | 521/134 |
| 2013/0210949 A1* | 8/2013 | Scholl | C08L 23/02 |
| | | | 521/143 |
| 2013/0251758 A1* | 9/2013 | Everland | A61L 27/18 |
| | | | 424/400 |
| 2013/0307193 A1* | 11/2013 | Johnson | C09J 129/04 |
| | | | 264/401 |
| 2014/0010879 A1* | 1/2014 | Shen | A61K 47/645 |
| | | | 424/489 |
| 2014/0042657 A1* | 2/2014 | Mulliken | H04N 1/00827 |
| | | | 264/40.1 |
| 2014/0102991 A1* | 4/2014 | Kharlampieva | B01J 37/009 |
| | | | 210/748.14 |
| 2014/0117585 A1* | 5/2014 | Douglas | B29C 47/92 |
| | | | 264/401 |
| 2014/0141168 A1* | 5/2014 | Rodgers | C08L 77/02 |
| | | | 427/265 |
| 2014/0186441 A1* | 7/2014 | Beck | A61L 27/48 |
| | | | 424/486 |
| 2014/0210137 A1* | 7/2014 | Patterson | B29C 47/025 |
| | | | 264/401 |
| 2014/0336514 A1* | 11/2014 | Peyman | A61B 5/1455 |
| | | | 600/473 |
| 2015/0024233 A1* | 1/2015 | Gunther | G05B 19/41875 |
| | | | 428/601 |
| 2016/0038632 A1* | 2/2016 | Shah | A61L 27/26 |
| | | | 424/422 |
| 2016/0130558 A1* | 5/2016 | Baer | A61P 1/16 |
| | | | 424/93.3 |
| 2016/0325491 A1* | 11/2016 | Sweeney | B29B 15/14 |
| 2016/0331869 A1* | 11/2016 | Biris | A61L 27/54 |
| 2017/0260351 A1* | 9/2017 | Hayward | C08J 9/28 |
| 2017/0362132 A1* | 12/2017 | Mullens | B22F 3/1121 |
| 2018/0142108 A1* | 5/2018 | Lewis | B28B 1/001 |
| 2018/0185547 A1* | 7/2018 | Grayson | A61L 27/3608 |

OTHER PUBLICATIONS

Brad Jones et al,. Nanoporous Materials Derived from Polymeric Bicontinuous Microemulsions, Chemistry of Materials Communication, 3 pages, Jan. 6, 2010, vol. 22, pp. 1279-1281.

E.K. Patel et al., Nanosponge and Micro Sponges: A Novel Drug Delivery System, International Journal of Research in Pharmacy and Chemistry, 8 pages, 2012, vol. 2, No. 2, pp. 237-244.

Zhiwei Xie, et al., Eleetrospun Poly (D,L-lactide) Fibers for Drug Delivery: The Influence of Cosolvent and the Mechanism of Drug Release, Journal of Applied Polymer Science, 8 pages, 2010, vol. 22, pp. 1279-1281.

International Search Report and Written Opinion for PCT/IB2014/062976, dated Dec. 5, 2014, 12 pages.

* cited by examiner

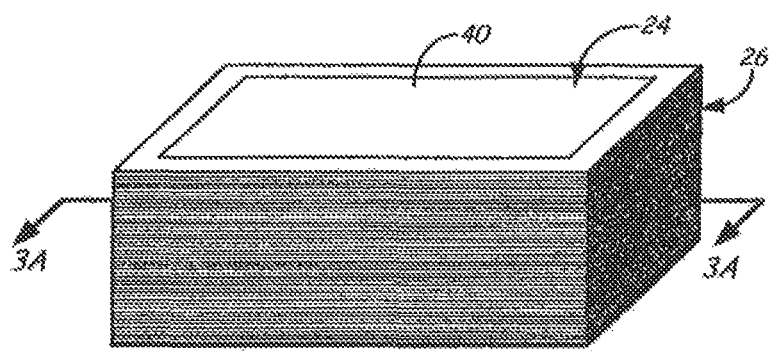
FIG. 2
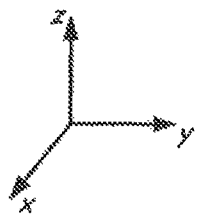
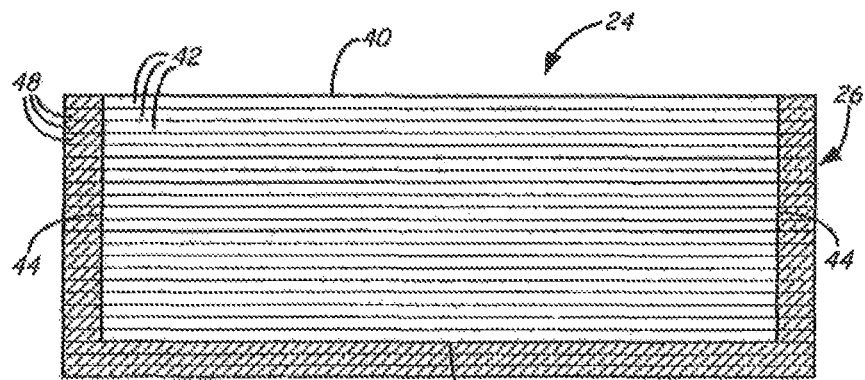
FIG. 3A

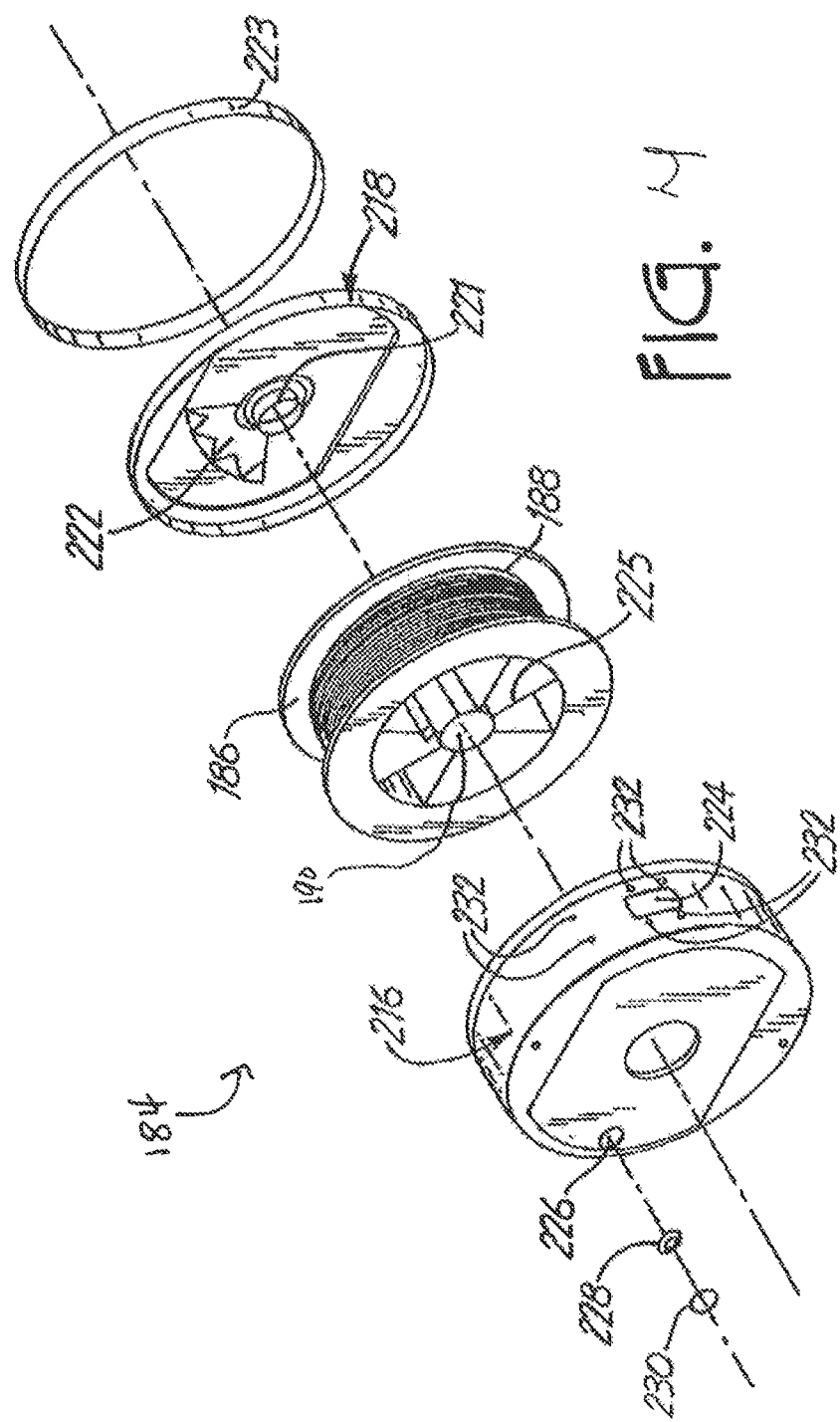

POLYMERIC MATERIAL FOR THREE-DIMENSIONAL PRINTING

RELATED APPLICATIONS

The present application is the national stage entry of International Patent Application No. PCT/IB2014/062976 having a filing date of Jul. 9, 2014, which claims priority to U.S. provisional application serial no. 61/863,944, filed on Aug. 9, 2013, which are incorporated herein in their entirety by reference thereto.

BACKGROUND OF THE INVENTION

Extrusion-based layered deposition systems are used to build a three-dimensional object from a computer-aided design ("CAD") model in a layer-by-layer manner by extruding a flowable build material. In such systems, the build material is typically extruded through an extrusion tip and deposited as a sequence of layers on a substrate in an x-y plane. The extruded build material fuses to previously deposited build material and solidifies upon a drop in temperature. The position of the extrusion head relative to the substrate is then incremented along a z-axis (perpendicular to the x-y plane), and the process is repeated to form a three-dimensional object resembling the CAD model. Supporting structures are often built underneath overhanging portions or in cavities of objects under construction, which are not supported by the build material itself. A support structure may be built using the same deposition techniques by which the build material is deposited. The host computer generates additional geometry acting as a support structure for the over hanging or free-space segments of the three-dimensional object being formed. Support material is then deposited from the same nozzle as the build material or a second nozzle pursuant to the generated geometry during the build process. The support material adheres to the build material during fabrication, and is removable from the completed three-dimensional object when the build process is complete. Additionally, a support structure may also be created prior to printing the 3-D object to provide a more stable base for the object.

Regardless of the particular system employed, two of the most common polymers that are used as build and support materials are acrylonitrile butadiene styrene ("ABS") and polylactic acid ("PLA"). ABS is a relatively flexible and machinable polymer, but it is not renewable and it also tends to curl or warp when placed into contact with the print surface. On the other hand, while PLA is renewable and less subject to warping, it is relatively brittle and lacks flexibility, Such properties can significantly the use of PLA in complex shapes, where a good balance between material stiffness and impact strength is required. As such, a need currently exists for an improved polymeric material that is capable of being employed as a build material and/or support material in three-dimensional printer systems.

SUMMARY OF THE INVENTION

In accordance with one embodiment of the present invention, a printer cartridge for use in a three-dimensional printer system is disclosed. The printer cartridge contains a spool that carries a polymeric material. The polymeric material is formed from a thermoplastic composition containing a continuous phase that includes a matrix polymer, and a microinclusion additive and nanoinclusion additive are dispersed within the continuous phase in the form of discrete domains.

In accordance with another embodiment of the present invention, a method for forming a three-dimensional object is disclosed. The method comprises printing a three-dimensional structure as series of successive layers of a build material and optionally printing a support structure from a support material. The build material, support material, or both contain a polymeric material formed from a thermoplastic composition containing a continuous phase that includes a matrix polymer. A microinclusion additive and nanoinclusion additive are dispersed within the continuous phase in the form of discrete domains.

Other features and aspects of the present invention are discussed in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended figures in which:

FIG. 2 is a perspective view of one embodiment of a three-dimensional precursor object that may be formed using the polymeric material of the present invention;

FIGS. 3A-3C are cross-sectional views of FIG. 2 taken along a line 3A-3A, depicting a process for building a three-dimensional object;

FIG. 4 is an exploded perspective view of one embodiment of a printer cartridge that may be employed in the present invention;

Figure 1:
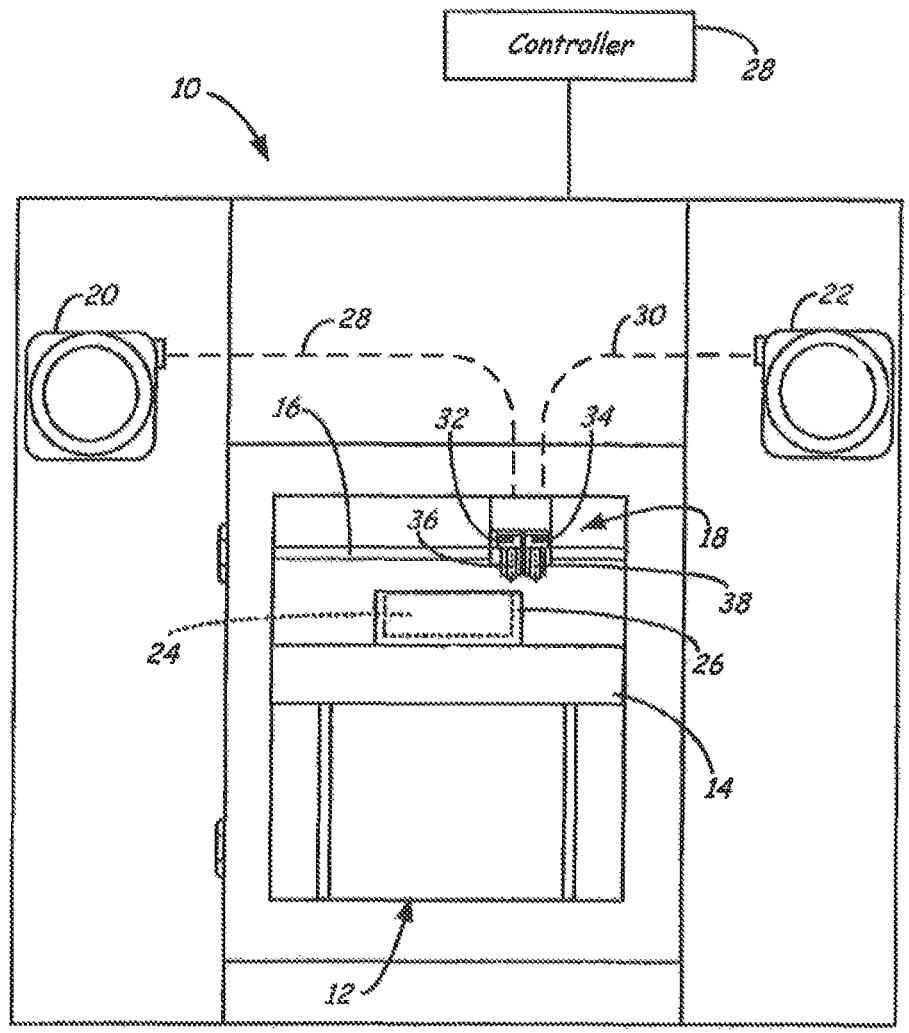
FIG. 1 is a front view of one embodiment of an extrusion-based three-dimensional printer system that may be employed in the present invention.

Repeat use of references characters in the present specification and drawings is intended to represent same or analogous features or elements of he invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a polymeric material that is capable of being employed as the build material and/or support material in a three-dimensional printer system. The material is flexible, yet also capable of retaining its shape, which can allow the material to be more readily printed into complex shapes. This unique combination of flexibility and shape retention properties may be achieved for a single, monolithic polymeric material through selective control over the manner in which the material is formed. More particularly, the polymeric material is formed from a thermoplastic composition containing a continuous phase that includes a matrix polymer, microinclusion additive, and nanoinclusion additive. The additives may be selected so that they have a different elastic modulus than the matrix polymer. In this manner, the microinclusion and nanoinclusion additives can become dispersed within the continuous phase as discrete micro-scale and nano-scale phase domains, respectively. When subjected to a deformational strain before, during and/or after three-dimensional printing, intensive localized shear regions and/or stress intensity regions (e.g., normal stresses) can form near the micro-scale discrete phase domains as a result of stress concentrations that arise from the incompatibility of the materials. These shear and/or stress intensity regions may cause some initial debonding in the polymer matrix adjacent to the micro-scale domains. Notably, however, localized shear and/or stress intensity regions may also be created near the nano-scale discrete phase domains that overlap with the micro-scale regions. Such overlapping shear and/or stress intensity regions cause even further debonding to occur in the polymer matrix, thereby creating a substantial number of pores adjacent to the nano-scale domains and/or micro-scale domains.

A porous network can thus be formed within the polymeric material. A substantial portion of the pores within this network may be of a "nano-scale" size ("nanopores"), such as those having an average cross-sectional dimension of about 800 nanometers or less, in some embodiments from about 5 to about 250 nanometers, and in some embodiments, from about 10 to about 100 nanometers. The term "cross-sectional dimension" generally refers to a characteristic dimension e.g., width or diameter) of a pore, which is substantially orthogonal to its major axis (e.g., length) and also typically substantially orthogonal to the direction of the stress applied during straining. Such nanopores may, for example, constitute about 15 vol. % or more, in some embodiments about 20 vol. % or more, in some embodiments from about 30 vol. % to 100 vol. %, and in some embodiments, from about 40 vol. % to about 90 vol. % of the total pore volume in the polymeric material. Due to their location adjacent to discrete domains (e.g., micro-scale and/or nano-scale), a bridge can be formed between the boundaries of the nanopores within the porous network that act as internal structural "hinges" to help stabilize the network. Among other things, this enhances the flexibility of the material yet allows it to retain a sufficient degree of strength so it can retain the desired shape after printing.

Micropores may also be formed at and around the micro-scale domains during drawing that have an average cross-sectional dimension of from about 0.5 to about 30 micrometers, in some embodiments from about 1 to about 20 micrometers, and in some embodiments, from about 2 micrometers to about 15 micrometers. The micropores and/or nanopores may have any regular or irregular shape, such as spherical, elongated, etc. In certain cases, the axial dimension of the micropores and/or nanopores may be larger than the cross-sectional dimension so that the aspect ratio (the ratio of the axial dimension to the cross-sectional dimension) is from about 1 to about 30, in some embodiments from about 1 to about 15, and in some embodiment, from about 1.2 to about 5. The "axial dimension" is the dimension in the direction of the major axis (e.g., length). The present inventors have also discovered that the pores (e.g., micropores, nanopores, or both) can be distributed in a substantially homogeneous fashion throughout the material. For example, the pores may be distributed in columns that are oriented in a direction generally perpendicular to the direction in which a stress is applied. These columns may be generally parallel to each other across the width of the material. Without intending to be limited by theory, it is believed that the presence of such a homogeneously distributed porous network can result in good mechanical properties.

Various embodiments of the present invention will now be described more detail.

Thermoplastic Composition

A. Matrix Polymer

As indicated above, the thermoplastic composition contains a continuous phase within which the microinclusion and nanoinclusion additives are dispersed. The continuous phase contains one or more matrix polymers, which typically constitute from about 60 wt. % to about wt. %, in some embodiments from about 75 wt. % to about 98 wt. %, and in some embodiments, from from about 80 wt. % to about 95 wt. % of the thermoplastic composition. The nature of the matrix polymer(s) used to he continuous phase is not critical and any suitable polymer may generally be employed, such as polyesters, polyolefins, styrenic polymers, polyamides etc. In certain embodiments, for example, polyesters may be employed in the composition to form the polymer matrix. Any of a variety of polyesters may generally be employed, such as aliphatic polyesters, such as polycaprolactone, polyesteramides, polylactic acid (PLA) and its copolymers, polyglycolic acid, polyalkylene carbonates (e.g., polyethylene carbonate), poly-3hydroxybutyrate (PHB), poly-3-hydroxyvalerate (PHV), poly-3-hydroxybutyrate-co-4-hydroybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.); aromatic polyesters (e.g., polyethylene terephthalate, polybutylene terephthalate, etc.); and so forth.

In certain cases, the thermoplastic composition may contain at least one polyester that is rigid in nature and thus has a relatively high glass transition temperature For example, the glass transition temperature ("$T_g$") may be about 0° C. or more, in some embodiments, from about,5° C. to about 100° C., in some embodiments from about 30° C. to about 80° C., and in some embodiments, from about 50° C. to about 75° C. The polyester may also have a melting temperature of from about 140° C. to about 300° C., in some embodiments from about 150° C. to about 250° C., and in some embodiments, from about 160° C. to about 220° C. The melting temperature may be determined using differential scanning calorimetry ("DSC") in accordance with ASTM D-3417. The glass transition temperature may be determined by dynamic mechanical analysis in accordance with ASTM E1640-09.

One particularly suitable rigid polyester is polylactic acid, which may generally be derived from of monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.).

In one particular embodiment, the polylactic acid has the following general structure:

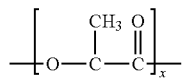

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458.

The polylactic acid typically has a number average molecular weight ("$M_n$") ranging from about 40,000 to about 180,000 grams per mole, in some embodiments from about 50,000 to about 160,000 grams per mole, and in some embodiments, from about 80,000 to about 120,000 grams per mole. Likewise, the polymer also typically has a weight average molecular weight ("$M_w$") ranging from about 80,000 to about 250,000 grams per mole, in some embodiments from about 100,000 to about 200,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

Some types of neat polyesters (e.g., polylactic acid) can absorb water from the ambient environ merit such that it has a moisture content of about 500 to 600 parts per million ("ppm"), or even greater, based on the dry weight of the starting polylactic acid. Moisture content may be determined in a variety of ways as is known in the art, such as in accordance with ASTM D 7191-05, such as described below. Because the presence of water during melt processing can hydrolytically degrade the polyester and reduce its molecular weight, it is sometimes desired to dry the polyester prior to blending. In most embodiments, for example, it is desired that the polyester have a moisture content of about 300 parts per million ("ppm")or less, in some embodiments about 200 ppm or less, in some embodiments about 1 to about 100 ppm prior to blending with the microinclusion and nanoinclusion additives. Drying of the polyester may occur, for instance, at a temperature of from about 50° C. to about 100° C., and in some embodiments, from about 70° C. to about 80° C.

B. Microinclusion Additive

As used herein, the term "microinclusion additive " generally refers to any amorphous, crystalline, or semi-crystalline material that is capable of being dispersed within the polymer matrix in the form of discrete domains of a micro-scale size. For example, prior straining, the domains may have an average cross-sectional dimension of from about 0.05 µm to about 30 µm, in some embodiments from about 0.1 µm to about 25 µm, in some embodiments from about 0.5 µm to about 20 µm, and in some embodiments from about 1 µm to about 10 µm. The term "cross-sectional dimension" generally refers to a characteristic dimension (e.g., width or diameter) of a domain, which is substantially orthogonal to its major axis (e.g., length) and also typically substantially orthogonal to the direction of the stress applied during straining. While typically formed from the microinclusion additive, it should be also understood that the micro-scale domains may also be formed from a combination of the microinclusion and nanoinclusion additives and/ or other components of the composition.

The microinclusion additive is generally polymeric in nature and possesses a relatively high molecular weight to help improve the melt strength and stability of the thermoplastic composition. Typically, the microinclusion polymer may be generally immiscible with the matrix polymer. In this manner, the additive can better become dispersed as discrete phase domains within a continuous phase of the matrix polymer. The discrete domains are capable of absorbing energy that arises from an external force, which increases the overall toughness and strength of the resulting material. The domains may have a variety of different shapes, such as elliptical, spherical, cylindrical, plate-like, tubular, etc. In one embodiment, for example, the domains have a substantially elliptical shape. The physical dimension of an individual domain is typically small enough to minimize the propagation of cracks through the polymeric material upon the application of an external stress, but large enough to initiate microscopic plastic deformation and allow for shear and/or stress intensity zones at and around particle inclusions.

While the polymers may be immiscible, the microinclusion additive may nevertheless be selected to have a solubility parameter that is relatively similar to that of the matrix polymer. This can improve the interfacial compatibility and physical interaction of the boundaries of the discrete and continuous phases, and thus reduces the likelihood that the composition will fracture. In this regard, the ratio of the solubility parameter for the matrix polymer to that of the additive is typically from about 0.5 to about 1.5, and in some embodiments, from about 0.8 to about 1.2. For example, the microinclusion additive may have a solubility parameter of from about 15 to about 30 MJoules$^{1/2}$/m$^{3/2}$, and in some embodiments, from about 18 to about 22 MJoules$^{1/2}$/m$^{3/2}$, while polylactic acid may have a solubility parameter of about 20.5 MJoules$^{1/2}$/m$^{3/2}$. The term "solubility parameter" as used herein refers to the "Hildebrand Solubility Parameter", which is the square root of the cohesive energy density and calculated according to the following equation:

$$\delta = \sqrt{((\Delta H_v - RT)/V_m)}$$

where:
$\Delta Hv$=heat of vaporization
R=Ideal Gas constant
T=Temperature
Vm=Molecular Volume The Hildebrand solubility parameters for many polymers are also available from the Solubility Handbook of Plastics, by Wyeych (2004), which is incorporated herein by reference.

The microinclusion additive may also have a certain melt flow rate for viscosity) to ensure that the discrete domains and resulting pores can be adequately maintained. For example, if the melt flow rate of the additive is too high, it tends to flow and disperse uncontrollably through the continuous phase. This results in lamellar, plate-like domains or co-continuous phase structures that are difficult to maintain and also likely to prematurely fracture. Conversely, if the melt flow rate of the additive is too low, it tends to clump together and form very large elliptical domains, which are difficult to disperse during blending. This may cause uneven distribution of the additive through the entirety of the continuous phase. In this regard, the present inventors have discovered that the ratio of the melt flow rate of the microinclusion additive to the melt flow rate of the matrix polymer is typically from about 0.2 to about 8, in some embodiments from about 0.5 to about 6, and in some embodiments, from about 1 to about 5. The microinclusion additive may, for example, have melt flow rate of from about 0.1 to about 250 grams per 10 minutes some embodiments from about 0.5 to about 200 grams per 10 minutes, and in some embodiments, from about 5 to about 150 grams per 10 minutes, determined at a load of 2160 grams and at 190° C.

In addition to the properties noted above, the mechanical characteristics of the microinclusion additive may also be selected to achieve the desired porous network. For example, when a blend of the matrix polymer and microinclusion additive is applied with an external force, stress concentrations (e.g., including normal or shear stresses) and shear and/or plastic yielding zones may be initiated at and around the discrete phase domains as a result of stress concentrations that arise from a difference in the elastic modulus of the additive and matrix polymer. Larger stress concentrations promote more intensive localized plastic flow at the domains, which allows them to become significantly elongated when stresses are imparted. These elongated domains can allow the composition to exhibit a more pliable and softer behavior than the matrix polymer, such as when it is a rigid polyester resin. To enhance the stress concentrations, the microinclusion additive may be selected to have a relatively low Young's modulus of elasticity in comparison to the matrix polymer. For example, the ratio of the modulus of elasticity of the matrix polymer to that of the additive is typically from about 1 to about 250, in some embodiments from about 2 to about 100, and in some embodiments, from about 2 to about 50. The modulus of elasticity of the microinclusion additive may, for instance, range from about 2 to about 1000 Megapascals (MPa), in some embodiments from about 5 to about 500 MPa, and in some embodiments, from about 10 to about 2001MPa. To the contrary, the modulus of elasticity of polylactic acid, for example, is typically from about 800 MPa to about 3000 MPa.

While a wide variety of microinclusion additives may be employed that have the properties identified above, particularly suitable examples of such additives may include synthetic polymers, such as polyolefins (e.g., polyethylene, polypropylene, polybutylene, etc.); styrenic copolymers (e.g., styrene-butadiene-styrene, styrene-isoprene-styrene, styrene-ethylene-propylene-styrene, styrene-ethylene-butadiene-styrene, etc.); polytetrafluoroethylenes; polyesters (e.g., recycled polyester, polyethylene terephthalate, etc.); polyvinyl acetates (e.g., poly(ethylene vinyl, acetate), polyvinyl chloride acetate, etc.); polyvinyl alcohols (e.g., polyvinyl alcohol, poly(ethylene vinyl alcohol), etc.); polyvinyl butyrals; acrylic resins (e.g., polyacrylate polymethylacrylate, polymethylmethacrylate, etc.); polyamides (e.g., nylon); polyvinyl chlorides; polyvinylidene chlorides; polystyrenes; polyurethanes; etc. Suitable polyolefins may, for instance, include ethylene polymers (e.g., low density polyethylene ("LDPE"), high density polyethylene ("HDPE"), linear density polyethylene ("LLDPE"), etc.), propylene homopolymers (e.g., syndiotactic, atactic, isotactic, etc.), propylene copolymers, and so forth.

In one particular embodiment, the polymer is a propylene polymer, such as homopolypropylene or a copolymer of propylene. The propylene polymer may, for instance, be formed from a substantially isotactic polypropylene homopolymer or a copolymer containing equal to or less than about 10 wt. % of other monomer, i.e., at least about 90% by weight propylene. Such homopolymers may have a melting point of from about 160° C. to about 170° C.

In still another embodiment, the polyolefin may be a copolymer of ethylene or propylene with another α-olefin, such as a $C_3$-$C_{20}$ α-olefin or $C_3$-$C_{12}$ α-olefin. Specific examples of suitable α-olefins include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene,1-hexene and 1-octene The ethylene or propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Exemplary olefin copolymers for use in the present invention include ethylene-based copolymers available under the designation EXACT™ from ExxonMobil Chemical Company of Houston, Tex. Other suitable ethylene copolymers are available under the designation ENGAGETM™, AFFINITY™, DOWLEX™ (LLDPE) and ATTANE ™ (ULDPE) from Dow Chemical Company of Midland, Mich. Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et el.; and U.S. Pat. No. 5,278,272 to Lai, et al. Suitable propylene copolymers are also commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Suitable polypropylene homopolymers may likewise include Exxon Mobil 3155 polypropylene, Exxon Mobil Achieve™ resins, and Total M3661 PP resin. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi. et al.

Any of a variety of known techniques may generally be employed to form the olefin copolymers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4 controlled short chain branching distribution, and controlled isotacticity.

Regardless of the materials employed, the relative percentage of the microinclusion additive in the thermoplastic composition is selected to achieve the desired properties without significantly impacting the base properties of the composition. For example, the microinclusion additive is typically employed in an amount of from about 1 wt. % to about 30 wt. % in some embodiments from about 2 wt. % to about 25 wt. %, and in some embodiments, from about 5 wt. % to about 20 wt. % of the thermoplastic composition, based on the weight of the continuous phase (matrix polymer(s)). The concentration of the microinclusion additive in the entire thermoplastic composition may likewise constitute from about 0.1 wt. % to about 30 wt. % in some embodiments from about 0.5 wt. % to about 25 wt. % and in some embodiments, from about 1 wt. % to about 20 wt. %.

C. Nanoinclusion Additive

As used herein, the term "nanoinclusion additive" generally refers to any amorphous, crystalline, or semi-crystalline material that is capable of being dispersed within the polymer matrix in the form of discrete domains of a nano-scale size. For example, prior to straining, the domains may have an average cross-sectional dimension of from about 1 to about 1000 nanometers, in some embodiments from about 5 to about 800 nanometers, in some embodiments from about 10 to about 500 nanometers, and in some embodiments from about 20 to about 200 nanometers. It should be also understood that the nano-scale domains may also be formed from a combination of the microinclusion and nanoinclusion additives and/or other components of the composition. The nanoinclusion additive is typically employed in an amount of from about 0.05 about 20 wt. % in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the nanoinclusion additive in the entire thermoplastic composition may likewise be from about 0.01 wt. % to about 15 wt. %, in some embodiments from about 0.05 wt. % to about 10 wt. %, and in some embodiments, from about 0.3 wt. % to about 6 wt. % of the thermoplastic composition.

The nanoinclusion additive may be polymeric in nature and possess a relatively high molecular weight to help improve the melt strength and stability of the thermoplastic composition. To enhance its ability to become dispersed into nano-scale domains, the nanoinclusion additive may also be selected from materials that are generally compatible with the matrix polymer and the microinclusion additive. This may be particularly useful when the matrix polymer or the microinclusion additive possesses a polar moiety, such as a polyester. One example such a nanoinclusion additive is a functionalized polyolefin. The polar component may, for example, be provided by one or more functional groups and the non-polar component may be provided by an olefin. The olefin component of the nanoinclusion additive may generally be formed from arty linear or branched α-olefin monomer, oligomer, or polymer (including copolymers) derived from an olefin monomer, such as described above.

The functional group of the nanoinclusion additive may be any group, molecular segment and/or block that provides a polar component to the molecule and is not compatible with the matrix polymer. Examples of molecular segment and/or blocks not compatible with polyolefin may include acrylates, styrenics. polyesters, polyamides, etc. The functional group can have an ionic nature and comprise charged metal ions. Particularly suitable functional groups are maleic anhydride, maleic acid, fumaric acid, maleimide, maleic acid hydrazide, a reaction product of maleic anhydride and diamine, methylnadic anhydride, dichloromaleic anhydride, maleic acid amide, etc. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond® and Eastman Chemical Company under the designation Eastman G series.

In certain embodiments, the nanoinclusion additive may also be reactive. One example of such a reactive nanoinclusion additive is a polyepoxide that contains, on average, at least two oxirane rings per molecule. Without intending to be limited by theory, it is believed that such polyepoxide molecules can induce reaction of the matrix polymer (e.g., polyester) under certain conditions, hereby improving its melt strength without significantly reducing glass transition temperature. The reaction may involve chain extension, side chain branching, grafting, copolymer formation, etc. Chain extension, for instance, may occur through a variety of different reaction pathways. For instance, the modifier may enable a nucleophilic ring-opening reaction via a carboxyl terminal group of a polyester (esterification) or via hydroxyl group (etherification). Oxazoline side reactions may likewise occur to form esteramide moieties. Through such reactions, the molecular weight of the matrix polymer may be increased to counteract the degradation often observed during melt processing. While it may be desirable to induce a reaction with the matrix polymer as described above, the present inventors have discovered that too much of a reaction can lead to crosslinking between polymer backbones. If such crosslinking is allowed to proceed to a significant extent, the resulting polymer blend can become brittle and difficult to process into a material with the desired strength and elongation properties.

In this regard, the present inventors have discovered that polyepoxides having a relatively low epoxy functionality are particularly effective, which may be quantified by its "epoxy equivalent weight." The epoxy equivalent weight reflects the amount of resin that contains one molecule of an epoxy group, and it may be calculated by dividing the number average molecular weight of the modifier by the number of epoxy groups in the molecule. The polyepoxide of the present invention typically has a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7. The polyepoxide may contain less than 50, in some embodiments from 5 to 45, and in some embodiments, from 15 to 40 epoxy groups. In turn, the epoxy equivalent weight may be less than about 15,000 grams per mole, in some embodiments from about 200 to about 10,000 grams per mole, and in some embodiments, from about 500 to about 7,000 grams per mole.

The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide contains at least one epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2 epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it may not only result in chain extension, but also help to achieve the desired blend morphology. The resulting melt flow rate of the polymer is thus typically within a range of from about 10 to about 200 grams per 10 minutes, in some embodiments from about 40 to about 150 grams per 10 minute, and in some embodiments, from about 60 to about 120 grams per 10 minutes, determined at a load of 2160 grams and at a temperature of 190° C.

If desired, additional monomers may also be employed in the polyepoxide to help achieve the desired molecular weight. Such monomers ay vary and include, for example, ester monomers, (meth)acrylic monomers, olefin monomers, amide monomers, etc. In one particular embodiment, for example, the polyepoxide includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene.

Another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate i-butyl acrylate t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one particularly desirable embodiment of the present invention, the polyepoxide is a terpolymer formed, from an epoxy-functional (meth)acrylic monomeric component, α-olefin monomeric component, and non-epoxy functional (meth)acrylic monomeric component. For example, the polyepoxide may be poly(ethylene-co-methylacrylate-co-glycidyl methacrylate), which has the following structure:

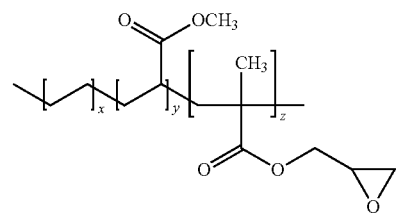

herein, x, y, and z are 1 or greater.

The epoxy functional monomer may be formed into a polymer using a variety of known techniques. For example, a monomer containing polar functional groups may be grafted onto a polymer backbone to form a graft copolymer. Such rafting techniques are well known in the art and described, for instance, in U.S. Pat. No. 5,179,164. In other embodiments, a monomer containing epoxy functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) may be selected to achieve a balance between epoxy-reactivity and melt flow rate. More particularly, high epoxy monomer content can result in good reactivity with the matrix polymer, but too high of a content may reduce the melt flow rate to such an extent that the polyepoxide adversely impacts the melt strength of the polymer blend. Thus, in most embodiments, the epoxy-functional (meth)acrylic monomer(s) constitute from about 1 wt. % to about 25 wt. %, in some embodiments from about 2 wt. % to about 20 wt. %, and in some embodiments, from about 4 wt. % to about 15wt. % of the copolymer. The α-olefin monomer(s) may likewise constitute from about 55 wt. % to about 95 wt. % in some embodiments from about 60 wt. % to about 90 wt. %, and in some embodiments, from about 65 wt. % to about 85wt. % of the copolymer. When employed, other monomeric components (e.g., non-epoxy functional (meth)acrylic monomers) may constitute from about 5 wt. % to about 35 wt. % in some embodiments from about 8 wt. % to about 30 wt. %, and in some embodiments, from about 10 wt. % to about 25 wt. % of the copolymer. One specific example of a suitable polyepoxide that may be used in the present invention is commercially available from Arkema under the name LOTADER® AX8950 or AX8900. LOTADER® AX8950, for instance, has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %. Another suitable polyepoxide is commercially available from DuPont under the name ELVALOY® PTW, which is a terpolymer of ethylene. butyl acrylate, and glycidyl methacrylate and has a melt flow rate of 12 g/10 min.

In addition to controlling the type and relative content of the monomers used to form the polyepoxide, the overall weight percentage may also be controlled to achieve the desired benefits. For example, if the modification level is too low, the desired increase in melt strength and mechanical properties may not be achieved. The present inventors have also discovered, however, that if the modification level is too high, processing may be restricted due to strong molecular interactions (e.g., crosslinking) and physical network formation by the epoxy functional groups. Thus, the polyepoxide is typically employed in an amount of from about 0.05 wt. % to about 10 wt. %, in some embodiments from about 0.1 wt. % to about 8 wt. %, in some embodiments from about 0.5 wt. % to about 5 wt. % and in some embodiments, from about 1 wt. % to about 3 wt. %, based on the weight of the matrix polymer employed in the composition. The polyepoxide may also constitute from about 0.05 wt. % to about 10 wt. %, in s ome embodiments a bout 0.05 wt. % to about 8 wt. % in some embodiments from about 0.1 wt. % to about 5 wt. %, and in some embodiments, from about 0.5 wt. % to about 3 wt. %, based on the total weight of the composition.

Other reactive nanoinclusion additives may also be employed in the present invention, such as oxazoline-functionalized polymers cyanide-functionalized polymers, etc. When employed, such rea ctive nanoinclusion additives may be employed within the concentrations noted above for the polyepoxide. In one particular embodiment, an oxazoline-grafted polyolefin may be employed that is a polyolefin grafted with an oxazoline ring-containing monomer. The oxazoline may include a 2-oxazoline, such as 2-vinyl-2-oxazoline (e.g., 2-isopropenyl-2-oxazoline), 2-fatty-alkyl-2-oxazoline (e.g., obtainable from the ethanolamide of oleic acid, linoleic acid, palmitoleic acid, gadoleic acid, erucic acid and/or arachidonic acid) and combinations thereof. In another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4, 4-dimethyl-2-oxazoline and combinations thereof.

Nanofillers may also be employed, such as carbon black, carbon nanotubes, carbon nanofibers, nanoclays, metal nanoparticles, nanosilica, nanoalumina, etc. Nanoclays are particularly suitable. The term "nanoclay" generally refers to nanoparticles of a clay material (a naturally occurring mineral, an organically modified mineral, or a synthetic nanomaterial), which typically have a platelet structure. Examples of nanoclays include, for instance, montmorillonite (2:1 layered smectite clay structure), bentonite (aluminium phyllosilicate formed primarily of montmorillonite), kaolinite (1:1 aluminosilicate having a platy structure and empirical formula of $Al_2Si_2O_5(OH)_4$), halloysite (1:1 aluminosilicate having a tubular structure and empirical formula of $Al_2Si_2O_5(OH)_4$), etc. An example of a suitable nanoclay is Cloisite®, which is a montmorillonite nanoclay and commercially available from Southern Clay Products, Inc. Other examples of synthethic nanoclays include but are not limited to a mixed-metal hydroxide nanoclay, layered double hydroxide nanoclay (e.g., sepiocite), laponite, hectorite, saponite, indonite, etc.

If desired, the nanoclay may contain a surface treatment to help improve compatibility with the matrix polymer (e.g., polyester). The surface treatment may be organic or inorganic. In one embodiment, an organic surface treatment is employed that is obtained by reacting an organic cation with the clay. Suitable organic cations may include, for instance, organoquaternary ammonium compounds that are capable of exchanging cations with the clay, such as dimethyl bis[hydrogenated tallow] ammonium chloride (2M2HT), methyl benzyl bis[hydrogenated tallow] ammonium chloride (MB2HT), methyl tris[hydrogenated tallow alkyl] chloride (M3HT), etc. Examples of commercially available organic nanoclays may include, for instance, Dellite® 43B (Laviosa Chimica of Livorno, Italy), which is a montmorillonite clay modified with dimethyl benzylhydrogenated tallow ammonium salt. Other examples include Cloisite® 25A and Cloisite® 0 30B (Southern Clay Products) and Nanofil 919 (Süd Chemie). If desired, the nanofiller can be blended with a carrier resin to form a masterbatch that enhances the compatibility of the additive with the other polymers in the composition. Particularly suitable carrier resins include, for instance, polyesters (e.g., polylactic acid, polyethylene terephthalate, etc.); polyolefins (e.g., ethylene polymers, propylene polymers, etc.); and so forth, as described in more detail above.

In certain embodiments of the present invention, multiple nanoinclusion additives may be employed in combination. For instance, a first nanoinclusion additive (e.g., polyepoxide) may be dispersed in the form of domains having an average cross-sectional dimension of from about 50 to about 500 nanometers, in some embodiments from about 60 to about 400 nanometers, and in some embodiments from about 80 to about 300 nanometers. A second nanoinclusion additive (e.g., nanofiller) may also be dispersed in the form of domains that are smaller than the first nanoinclusive additive, such as those having an average cross-sectional dimension of from about 1 to about 50 nanometers, in some embodiments from about 2 to about 45 nanometers, and in some embodiments from about 5 to about 40 nanometers. When employed, the first and/or second nanoinclusion additives typically constitute from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the first and/or second nanonclusion additives in the entire thermoplastic composition may likewise be from about 0.01 wt. % to about 15 wt. %, in some embodiments from about 0.05 wt. % to about 10 wt. %, and in some embodiments, from about 0,1 wt. % about 8 wt. % of the thermoplastic composition.

D. Other Components

A wide variety of ingredients may be employed in the composition for a variety of different reasons. For instance, in one particular embodiment, an interphase modifier may be employed in the thermoplastic composition to help reduce the degree of friction and connectivity between the microinclusion additive and matrix polymer, and thus enhance the degree and uniformity of debonding. In this manner, the pores can become distributed in a more homogeneous fashion throughout the composition. The modifier may be in a liquid or semi-solid form at room temperature (e.g., 25° C.) so that it possesses a relatively low viscosity, allowing it to be more readily incorporated into the thermoplastic composition and to easily migrate to the polymer surfaces. In this regard, the kinematic viscosity of the interphase modifier is typically from about 0.7 to about 200 centistokes ("cs"), in some embodiments from about 1 to about 100 cs, and in some embodiments, from about 1.5 to about 80 cs, determined at 40° C. In addition, the interphase modifier is also typically hydrophobic so that it has an affinity for the microinclusion additive, for example, resulting in a change in the interfacial tension between the matrix polymer and the additive. By reducing physical forces at the interfaces between the matrix polymer and the microinclusion additive, it is believed that the low viscosity, hydrophobic nature of the modifier can help facilitate debonding. As used herein the term "hydrophobic" typically refers to a material having a contact angle of water in air of about 40° or more, and in some cases, a bout 60° or more. In contrast, the term "hydrophilic" typically refers to a material having a contact angle of water in air of less than about 40°. One suitable test for measuring the contact angle is ASTM D5725-99 (2008).

Suitable hydrophobic, low viscosity interphase modifiers may include, for instance, silicones, silicone-polyether copolymers, aliphatic polyesters, aromatic polyesters, alkylene glycols (e.g., ethylene glycol, diethylene glycol, triethylene glycol, tetraethylene glycol, propylene glycol, polyethylene glycol, polypropylene glycol, polybutylene glycol, etc.), alkane diols (e,g., 1,3-propanediol, 2,2-dimethyl-1,3-propanediol, 1,3-butanediol, 1,4-butanediol, 1,5-pentanediol, 1,6-hexanediol, 2,2,4-trimethyl-1,6 hexanediol, 1,3-cyclohexanedimethanol, 1,4-cyclohexanedimethanol, 2,2,4,4-tetramethyl-1,3-cyclobutanediol, etc.), amine oxides (e.g., octyldimethylamine oxide), fatty acid esters, fatty acid amides (e.g., oleamide, erucamide, stearamide, ethylene bis(stearamide), etc.), mineral, and vegetable oils, and so forth. One particularly suitable liquid or semi-solid is polyether polyol, such as commercially available under the trade name Pluriol® WI from BASF Corp. Another suitable modifier is a partially renewable ester, such as commercially available under the trade name HALLGREEN® IM from Hallstar.

When employed, the interphase modifier may constitute from about 0.1 wt. % to about 20 wt. %, in some embodiments from about 0,5 wt. % to about 5 wt. %, and in some embodiments, from about 1 wt. % to about 10 wt. % of the thermoplastic composition, based on the weight of the continuous phase (matrix polymer(s)). The concentration of the interphase modifier in the entire thermoplastic composition may likewise constitute from about 0.05 wt. % to about 20 wt. %, in some embodiments from about 0.1 wt. % to about 15 wt. % and in some embodiments, from about 0.5 wt. % to about 10 wt. %.

When employed in the amounts noted above, the interphase modifier has a character that enables it to readily migrate to the interfacial surface of the polymers and facilitate debonding without disrupting the overall melt properties of the thermoplastic composition. For example, the interphase modifier does not typically have a plasticizing effect on the polymer by reducing its glass transition temperature. Quite to the contrary, the present inventors have discovered that the glass transition temperature of the thermoplastic composition may be substantially the same as the initial matrix polymer. In this regard, the ratio of the glass temperature of the composition to that of the matrix polymer is typically from about 0.7 to about 1.3 in some embodiments from about 0.8 to about 1.2, and in some embodiments about 0.9 to about 1.1. The thermoplastic composition may, for example, have a glass transition temperature of from about 35° C. to about 80° C., in some embodiments from about 40° C. to about 80° C., and in some embodiments, from about 50° C. to about 65° C. The melt rate of the thermoplastic composition may also be similar to that of the matrix polymer. For example, the melt flow rate of the composition (a dry basis) may be from about 0.1 to about 70 grams per 10 minutes, in some embodiments from about 0.5 to about 50 grams per 10 minutes, and in some embodiments, from about 5 to about 25 grams per 10 minutes determined at a load of 2160 grams and at a temperature of 190° C.

Compatibilizers may also be employed that improve interfacial adhesion and reduce the interfacial tension between the domain and the matrix, thus allowing the formation of smaller domains during mixing. Examples of suitable compatibilizers may include, for instance, copolymers functionalized with epoxy or maleic anhydride chemical moieties. An example of a maleic anhydride compatibilizer is polypropylene-grafted-maleic anhydride, which is commercially available from Arkema under the trade names Orevac™ 18750 and Orevac™ CA 100. When employed, compatibilizers may constitute from about 0.05 wt. % to about 10 wt. %, in some embodiments from about 0.1 wt. % to about 8 wt. %, and in some embodiments, from about 0.5 wt. % to about 5 wt. % of the thermoplastic composition, based on the weight of the continuous phase matrix.

Other suitable materials that may also be used in the thermoplastic composition, such as catalysts, antioxidants, stabilizers, surfactants, waxes, solid solvents, fillers, nucleating agents (e.g., calcium carbonate, etc.), particulates, and other materials added to enhance the processability and mechanical properties of the thermoplastic composition. Nevertheless, one beneficial aspect of the present invention is that good properties may be provided without the need for various conventional additives, such as blowing agents (e.g., chlorofluorocarbons, hydrochlorofluorocarbons, hydrocarbons, carbon dioxide, supercritical carbon dioxide, nitrogen, etc.) and plasticizers (e.g., solid or semi-solid polyethylene glycol). In fact, the thermoplastic composition may be generally free of blowing agents and/or plasticizers. For example, blowing agents and/or plasticizers may be present in an amount of no more than about 1 wt. % in some embodiments no more than about 0.5 wt. %, and in some embodiments, from about 0.001 wt. % to about 0.2 wt. % of the thermoplastic composition. Further, due to its stress whitening properties, as described in more detail below, the resulting composition may achieve an opaque color (e.g., white) without the need for conventional pigments, such as titanium dioxide. In certain embodiments, for example, pigments may be present in an amount of no more than about 1 wt. %, in some embodiments no more than about 0.5 wt. %, and in some embodiments, from about 0.001 wt. % to about 0.2 wt. % of the thermoplastic composition.

II. Polymeric Material

To form the initial thermoplastic composition of the polymeric material, the components are typically blended together using any of a variety of known techniques. In one embodiment, for example, the components may be supplied separately or in combination. For instance, the components may first be dry mixed together to form an essentially homogeneous dry mixture, and they may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, N.J. or a Thermo Prism™ USALAB 16 extruder available from Thermo Electron Corp., Stone, England). Such extruders may include feeding and venting ports and provide high intensity distributive and dispersive mixing. For example, the components may be fed to the same or different feeding ports of the twin-screw extruder and melt blended to form a substantially homogeneous melted mixture. If desired, other additives may also be injected into the polymer melt and/or separately fed into the extruder at a different point along its length.

The resulting melt blended composition may contain micro-scale domains of the microinclusion additive and nano-scale domains of the nanoinclusion additive as described above. The degree of shear/pressure and heat may be controlled to ensure sufficient dispersion, but not so high as to adversely reduce the size of the domains so that they are incapable of achieving the desired properties. For example, blending typically occurs at a temperature of from about 180° C. to about 300° C., in some embodiments from about 185° C. to about 250° C. and in some embodiments, from about 190° C. to about 240° C. Likewise the apparent shear rate during melt processing may range from about 10 $s^{-1}$ to about 3000 $s^{-1}$, in some embodiments from about 50 $s^{-1}$ to about 2000 $s^{-1}$, and in some embodiments, from about 100 $s^{-1}$ to about 1200 $s^{-1}$. The apparent shear rate may be equal to $4Q/\pi R^3$, where Q is the volumetric flow rate ("$m^3/s$") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

To achieve the desired shear conditions (e.g., rate, residence time, shear rate, melt processing temperature, etc.), the speed of the extruder screw(s) may be selected with a certain range. Generally, an increase in product temperature is observed with increasing screw speed due to the additional mechanical energy input into the system. For example, the screw speed may range from about 50 to about 600 revolutions per minute ("rpm"), in some embodiments from about 70 to about 500 rpm, and in some embodiments, from about 100 to about 300 rpm. This may result in a temperature that is sufficiently high to disperse the microinclusion additive without adversely impacting the size of the resulting domains. The melt shear rate, and in turn the degree to which the additives are dispersed, may also be increased through the use of one or more distributive and/or dispersive mixing elements within the mixing section of the extruder. Suitable distributive mixers for single screw extruders may include, for instance, Saxon, Dulmage, Cavity Transfer mixers etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer fixers, and Vortex Intermeshing Pin (VIP) mixers.

The resulting polymeric material may have a variety of different forms such as filaments, films, fibrous materials, etc., as well as composites and laminates thereof. Regardless, a porous network may be introduced in the polymeric material before, during and/or after three-dimensional printing by subjected the material to a deformational strain, such as in the length direction (e.g., machine direction or "x" direction), width direction (e.g., cross-machine direction or "y" direction), height direction (e.g., "z" direction), as well as combinations thereof. In one embodiment, for instance, the polymeric material may be formed into the desired shape (e.g., filament), subjected to the desired strain, and thereafter supplied to a three-dimensional printer system. In yet another embodiment, the material may be printed and thereafter subjected to the desired strain, such as by the user. Of course, the material may also be strained in situ as it is being shaped into the desired form. Any of a variety of techniques may generally be employed to strain the polymeric material. For example, in certain cases, the polymeric material may simply be bent or folded by a user. In yet other embodiments, drawing techniques may be employed, such as aspiration (e.g., fiber draw units), tensile frame drawing, biaxial drawing, multi-axial drawing, profile drawing, vacuum drawing, etc.

Regardless of the technique chosen, the degree of straining depends in part of the nature of the material being drawn, but is generally selected to ensure that the desired porous network is achieved. In this regard, the composition is typically strained (e.g., in the machine direction) to a draw ratio of from about 1.1 to about 3.5, in some embodiments from about 1.2 to about 3.0, and in some embodiments, from about 1.3 to about 2.5. The draw ratio may be determined by dividing the length of the drawn material by its length before drawing. The draw rate may also vary to help achieve the desired properties, such as within the range of from about 5% to about 1500% per minute of deformation, in some embodiments from about 20% to about 1000% per minute of deformation, and in some embodiments, from about 25% to about 850% per minute of deformation. The material is generally kept at a temperature below the glass temperature of the matrix polymer and microinclusion additive during straining. Among other things, this helps to ensure that the polymer chains are not altered to such an extent that the porous network becomes unstable. For example, the material may be strained at a temperature that is at least about 10° C., in some embodiments at least about 20° C., and in some, embodiments, at least about 30° C. below the glass transition temperature of the matrix polymer. For example, the material may be strained at a temperature of from about −50° C. to about 50° C., in some embodiments from about −25° C. to about 40° C., and in some embodiments, from about −20° C. to about 35° C. Although the material is typically strained without the application of external heat (e.g., heated rolls), such heat might be optionally employed to improve processability, reduce draw force, increase draw rates, and improve material uniformity.

In addition to forming a porous network, straining can also significantly increase the axial dimension of the microscale domains so that they have a generally linear, elongated shape. For example, the elongated micro-scale domains may have an average axial dimension that is about 10% or more, in some embodiments from about 20% to about 500%, and in some embodiments, from about 50% to about 250% greater than the axial dimension of the domains prior to drawing. The axial dimension after straining may, for instance, range from about 0.5 to about 250 micrometers, in some embodiments about 1 to about 100 micrometers, in some embodiments from about 2 to about 50 micrometers, and in some embodiments, from about 5 to about 25 micrometers. The micro-scale domains may also be relatively thin and thus have a small cross-sectional dimension, such as from about 0.05 to about 50 micrometers, in some embodiments from about 0.2 to about 10 micrometers, and in some embodiments, from 0.5 to about 5 micrometers. This may result in an aspect ratio for the first domains (the ratio of the axial dimension to the cross-sectional dimension) of from about 2 to about 150, in some embodiments from about 3 to about 100, and in some embodiments from about 4 to about 50.

After straining, the resulting polymeric material is generally porous and defines a porous network which, for instance, may constitute from about 15% to about 80% per $cm^3$, in some embodiments from about 20% to about 70%, and in some embodiments from about 30% to about 60% per cubic centimeter of the material. As noted above, the presence of such a high pore volume can enhance the flexibility of the polymeric material. In one embodiment, for instance, the polymeric material may exhibit a modulus of elasticity of about 2500 Megapascals ("MPa") or less, in some embodiments about 2200 MPa or less, in some embodiments from about 50 MPa to about 2000 MPa, and in some embodiments, from about 100 MPa to about 1000 MPa, such as determined in accordance with ASTM D638-10 at 23° C. The presence of a high pore volume can also provide other benefits. For example, the relatively high pore volume of the material can significantly lower the density of the material, which can allow the use of lighter, more flexible materials that still achieve good properties. For example, the material may have a relatively low density, such as about 1.2 grams per cubic centimeter ("$g/cm^3$") or less, in some embodiments about 1.0 $g/cm^3$ or less, in some embodiments about 0.2 $g/cm^3$ to about 0.8 $g/cm^3$, and in some embodiments, from about 0.1 $g/cm^3$ to about 0.5 $g/cm^3$.

III. Three-Dimensional Printing

As indicated above, the unique structure of the polymeric material of the present invention allows it to more readily undergo physical deformation and create a complex three-dimensional structure during printing. The polymeric material may be employed as the build material that forms the three-dimensional structure and/or the support material that is removed from the three-dimensional structure after it is formed. Regardless of the manner in which it is employed, the polymeric material may be supplied to the three-dimensional printer in a variety of different forms, such as in the form of a sheet, film, fiber, filament, etc. In one particular embodiment, the polymeric material is supplied in the form of filaments, such as described in U.S. Pat. No. 6,923,634 to Swanson, et al. and U.S. Pat. No. 7,122,246 to Comb, et al. Such filaments may, for example, have an average diameter of from about 0.1 to about 20 millimeters, in some embodiments from about 0.5 to about 10 millimeters and in some embodiments, from about 1 to about 5 millimeters.

The polymeric material of the present invention is generally included within a printer cartridge that is, readily adapted for incorporation into the printer system. The printer cartridge may, for example, contains a spool or other similar device that carries the polymeric material. When supplied in the form of filaments, for example, the spool may have a generally cylindrical rim about which the filaments are wound. The spool may likewise define a bore or spindle that allows it to be readily mounted to the printer during use. Referring to FIG. 4, for example, one embodiment of a spool 186 is shown that contains an outer rim about which filaments 188 are wound. A generally cylindrical bore 190 is also defined within a central region of the spool 186 about which multiple spokes 225 are axially positioned.

Although not required, the printer cartridge may also, contain a housing structure that encloses the spool and thus protects the filaments from the exterior environment prior to use. In FIG. 4, for instance, one embodiment of such a cartridge 184 is shown that contains a canister body 216 and a lid 218 that are mated together to define an interior chamber for enclosing the spool 186. In this embodiment, the lid 218 contains a first spindle 227 and the canister body 216 contains a second spindle (not shown). The spool 186 may be positioned so that the spindles of the canister body and/or lid are positioned within the bore 190. Among other things, this can allow the spool 186 to rotate during use. A spring plate 222 may also be attached to the inside of the lid 218 that has spiked fingers, which are bent to further enhance rotation of the spool 186 in only the direction that will advance filament out of the cartridge 184. Although not shown, a guide block may be attached to the canister body 216 at an outlet 224 to provide an exit path for the filament 188 to the printer system. The guide block may be fastened to the canister body 216 by a set of screws (not shown) that can extend through holes 232.

When the polymeric material contains a moisture-sensitive material, such as polylactic acid, it is generally desired to seal the cartridge 184 prior to use. For example, a moisture-impermeable material 223 (e.g., tape) may be employed to help seal the lid 218 to the canister body 216. Moisture can be withdrawn from the interior chamber of the canister body 216 through a hole 226, which can thereafter be sealed with a plug 228. A moisture-impermeable material 230 may also be positioned over the plug 228 to further seal the hole 226. Before sealing the cartridge 184, it may be dried to achieve the desired moisture content. For example, the cartridge 184 may be dried in an oven under vacuum conditions. Likewise, a desiccant material may also be placed within the cartridge 184, such as within compartments defined by the spokes 225 of the spool 186. Once fully assembled the cartridge 184 may optionally be sealed within a moisture-impermeable package.

Generally speaking, any of a variety of three-dimensional printer systems can be employed in the present invention. Particularly suitable printer systems are extrusion-based systems, which are often referred to as "fused deposition modeling" systems. Referring to FIG. 1 for example, one embodiment of an extrusion-based, three-dimensional printer system 10 is shown that may be employed to print a precursor object containing three-dimensional build structure 24 and a corresponding support structure 26. In the particular embodiment illustrated, the system includes a build chamber 12 and supply sources 20 and 22. As noted above, the polymeric material of the present invention may be used to form the build structure 24 and/or support structure 26. Thus for example, printer cartridges containing the polymeric material may be provided as supply sources 20 and/or 22. In those embodiments in which the polymeric material of the present invention is only employed in the build structure or the support structure, it should be understood any other conventional material can be employed for the other structure. For example, in certain embodiments, the polymeric material of the present invention may be used to form the build structure 24. In such embodiments, suitable materials for the support structure 26 may include conventional materials that are soluble or at least partially soluble in water and/or an aqueous alkaline solution, which is suitable for removing support structure 26 in a convenient manner without damaging build structure 24. Examples of such materials may include those commercially available under the trademarks "SR10", "SR20", and "SR30" Soluble Supports from Stratasys, Inc., as well as those described in U.S. Pat. No. 6,070,107 to Lombardi et al. U.S. Pat. No. 6,228,923 to Lombardi et al., U.S. Pat. No. 6,790,403 to Priedeman et al., and U.S. Pat. No. 7,754,807 to Priedeman et al.

The material for the build structure 24 is supplied to a print head 18 from the supply source 20 via a feed line 28 and the support material for the support structure 26 is supplied to the print head 18 from supply source 30 via a feed line 30. The build chamber 12 likewise contains a platen 14 and gantry 16. The platen 14 is a platform on which the build structure 24 and support structure 26 are built. The platen 14 desirably moves along a vertical z-axis based on signals provided from a computer-operated controller 28. The gantry 16 is a guide rail system that is desirably configured to move the print head 18 in a horizontal x-y plane within the build chamber 12 based on signals provided from controller 28. The horizontal x-y plane is a plane defined by an x-axis and a y-axis (not shown), where the x-axis the y-axis, and the z-axis are orthogonal to each other. In an alternative embodiment, the platen 14 may be configured to move in the horizontal x-y plane within the build chamber 12, while the print head 18 may be configured to move along the z-axis. Other similar arrangements may also be employed such that one or both of the platen 14 and the print head 18 are moveable relative to each other.

The print head 18 is supported by the gantry 16 and is configured for printing the build structure 24 and the support structure 26 on the platen 14 in a layer-by-layer manner, based on signals provided from the controller 28. In the embodiment shown in FIG. 1, for example, the print head 18 is a dual-tip extrusion head configured to deposit build and support materials from the supply source 20 and the supply source 22, respectively. Examples of such extrusion heads are described in more detail in U.S. Pat. No. 5,503 785 to Crump, et al.; U.S. Pat. No. 6,004,124 to Swanson, et al,: U.S. Pat. No. 7,604,470 to LaBossiere, et al., and U.S. Pat. No. 7,625,200 to Leavitt. The system 10 may also include other print heads for depositing build and/or support materials from one or more tips. As shown, the print head 18 includes drive mechanisms 32 and 34, and liquefier assemble 36 and 38. During a print operation, the gantry 16 moves the print head 18 in the horizontal x-y plane within the build chamber 12, and the drive mechanisms 32 and 34 are directed to intermittently feed the build and support materials from supply sources 20 and 32 through the liquefier assemblies 36 and 38. In alternative embodiments, the print head 18 may function as a multiple-stage screw pump, such as described in U.S. Pat. No. 5,764,521 to Batchelder, et al. and U.S. Pat. No. 7,891,964 to Skubic, et al.

As shown in FIG. 2, the build structure 24 is printed onto the platen 14 as a series of successive layers of the build material, and the support structure 26 is likewise printed as a series of successive layers in coordination with the printing of the build structure 24. In the illustrated embodiment, the build structure 24 is shown as a simple block-shaped object having a top surface 40, four lateral surfaces 44 (FIG. 3A), and a bottom surface 46 (FIG. 3A). Although by no means required, the support structure 26 in this embodiment its deposited to at least partially encapsulate the layers of build structure 24. For example, the support structure 26 may be printed to encapsulate the lateral surfaces and the bottom surface of build structure 24. Of course, in alternative embodiments, the system 10 may print three-dimensional objects having a variety of different geometries. In such embodiments, the system 10 may also print corresponding support structures, which optionally, at least partially encapsulate the three-dimensional objects.

Figure 3B:
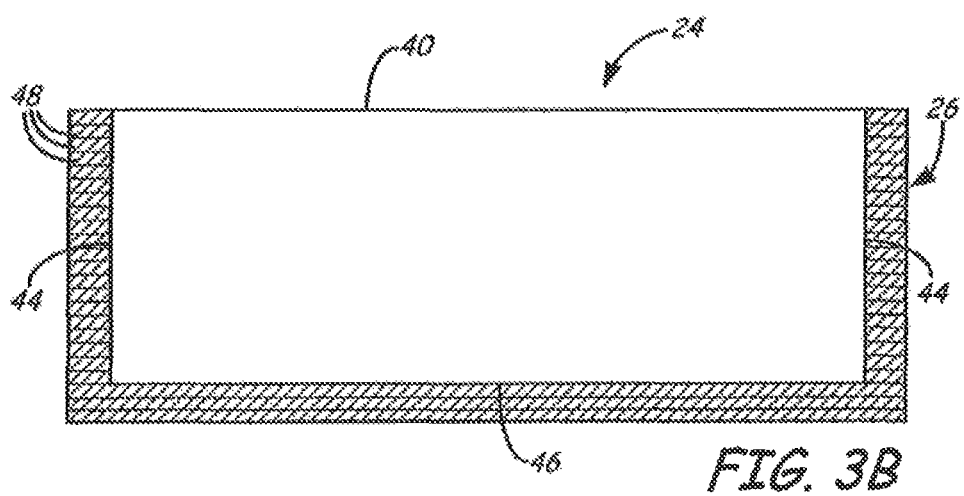
Figure 3C:
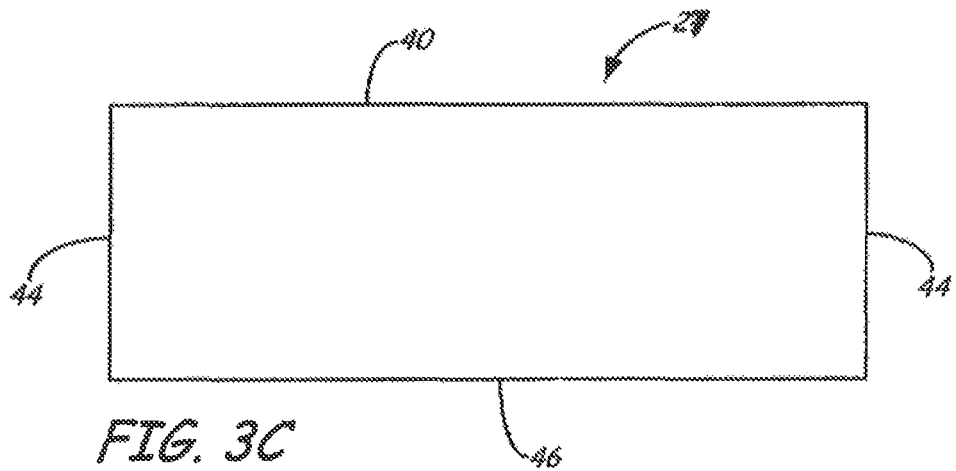

FIGS. 3A-3C illustrate the process of for printing the three-dimensional build structure 24 and support, structure 26 in the manner described above. As shown FIG. 3A, each layer of the build structure 24 is printed in a series of layers 42 to define the geometry of the build structure 24. In this embodiment, each layer of the support structure 26 is printed in a series of layers 48 in coordination with the printing of layers 42 of the three-dimensional build structure 24, where the printed layers 48 of the support structure 26 encapsulate the lateral surfaces 44 and the bottom surface 46 of the build structure 24. In the illustrated embodiment, the top surface 40 is not encapsulated by the layers 48 of the support structure 26. After the print operation is complete, the support structure 26 may be removed from the build structure 24 to create a three-dimensional object 27. For example, in embodiments in which the support material is at least partially soluble in water or an aqueous alkaline solution, the resulting object may be immersed in water and/or aqueous alkaline solution bath to dissolve the support structure 26.

The present invention may be better understood with reference to the following examples.

Test Methods

Tensile Properties:

Materials may be tested for tensile properties (peak stress, modulus, strain at break, and energy per volume at break) on a MTS Synergic 200 tensile frame. The test may be performed in accordance with ASTM D638-10 (at about 23° C.). Samples may be cut into dog bone shapes with a center width of 3.0 mm before testing. The dog-bone samples may be held in place using grips on the MTS Synergic 200 device with a gauge length of 18.0 mm. The samples may be stretched at a crosshead speed of 5.0 in/min until breakage occurred. Five samples may be tested in both the machine direction (MD) and the cross direction (CD). A computer program (e.g., TestWorks 4) may be used to collect data during testing and to generate a stress versus strain curve from which a number of properties may be determined, including modulus, peak stress, elongation, and energy to break.

Melt Flow Rate:

The melt flow rate ("MFR") is he weight of a polymer (in grams) forced through an extrusion rheometer orifice (0.0825-inch diameter) when subjected to a load of 2160 grams in 10 minutes, typically at 190° C., 210° C., or 230° C. Unless otherwise indicated, melt flow rate is measured in accordance with ASTM Test Method D1239 with a Tinius Olsen Extrusion Plastometer.

Thermal Properties:

The glass transition temperature ($T_g$) may be determined by dynamic mechanical analysis (DMA) in accordance with ASTM E1640-09. A Q800 instrument from TA Instruments may be used. The experimental runs may be executed in tension/tension geometry, in a temperature sweep mode in the range from –120° C. to 150° C. with a heating rate of 3° C./min. The strain amplitude frequency may be kept constant (2 Hz) during the test. Three (3) independent samples may be tested to get an average glass transition temperature, which is defined by the peak value of the tan δ curve, wherein tan δ is defined as the ratio of the loss modulus to the storage modulus (tan $\delta = E''/E'$).

The melting temperature may be determined by differential scanning calorimetry (DSC). The differential scanning calorimeter may be a DSC Q100 Differential Scanning calorimeter, which may be outfitted with a liquid nitrogen cooling accessory and with a UNIVERSAL ANALYSIS 2000 (version 4.6.6) analysis software program both of which are available from T.A. Instruments Inc. of New Castle, Del. To avoid directly hand ling the samples, tweezers or other tools may be used. The samples may be placed into an aluminum pan and weighed to an accuracy of 0.01 milligram on an analytical balance. A lid may be crimped over the material sample onto the pan. Typically, the resin pellets may be placed directly in the weighing pan.

The differential scanning calorimeter may be calibrated using an indium metal standard and a baseline correction may be performed, as described in the operating manual for the differential scanning calorimeter. A material sample may be placed into the test chamber of the differential scanning calorimeter for testing, and an empty pan may be used as a reference. All testing may be run with a 55-cubic centimeter per minute nitrogen (industrial oracle) purge on the test chamber. For resin pellet samples, the heating and cooling program is a 2-cycle test that began with an equilibration of the chamber to –30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of –30° C., followed by equilibration of the sample at –30° C. for 3 minutes, and then a second heating period at a heating rate of 10° C. per minute to a temperature of 200° C. For fiber samples, the heating and cooling program may be a 1-cycle test that begins with an equilibration of the chamber to –25° C., followed by a heating period at a heating rate of 10° C. per minute to a temperature of 200° C., followed by equilibration of the sample at 200° C. for 3 minutes, and then a cooling period at a cooling rate of 10° C. per minute to a temperature of –30° C. All testing may be run with a 55-cubic centimeter per minute nitrogen (industrial grade) purge on the test chamber.

The results may be evaluated using the UNIVERSAL ANALYSIS 2000 analysis software program, which identifies and quantifies the glass transition temperature ($T_g$) of inflection, the endothermic and exothermic peaks, and the areas under the peaks on the DSC plots. The glass transition temperature may be identified as the region on the plot-line where a distinct change in slope occurred, and the melting temperature may be determined using an automatic inflection calculation.

Density and Percent Pore Volume:

To determine density and percent pore volume, the width ($W_i$) and thickness ($T_i$) of the specimen may be initially measured prior to drawing. The length ($L_i$) before drawing may also be determined by measuring the distance between two markings on a surface of the specimen. Thereafter, the specimen may be drawn to initiate voiding. The width ($W_f$), thickness ($T_f$), and length ($L_f$) of the specimen may then be measured to the nearest 0.01 mm utilizing Digimatic Caliper (Mitutoyo Corporation). The volume ($V_i$) before drawing may be calculated $W_i \times T_i = L_i = V_i$. The volume ($V_f$) after drawing may also be calculated by $W_f \times T_f \times L_f = V_f$. The density ($P_f$) may be calculated by: $P_f = P_i / \Phi$, where $P_i$ is density of precursor material, and the percent pore volume (% $V_v$) may be calculated by: % $V_v = (1 - 1/\Phi) \times 100$.

Moisture Content:

Moisture content may be determined using a Arizona Instruments Computrac Vapor Pro moisture analyzer (Model No. 310 0) in substantial accordance with ASTM D 7191-05, which is incorporated herein in its entirety by reference thereto for all purposes. The test temperature (§X2.1.2) may be 130° C., the sample size (§X2.1) may be 2 to 4 grams, and the vial purge time (§X2.1 4) may be 30 seconds. Further, the ending criteria (§X2.1.3) may be defined as a "prediction" mode, which means that the test is ended when the built-in programmed criteria (which mathematically calculates the end point moisture content) is satisfied:

EXAMPLE 1

The ability to create a unique porous network within a polymeric material as demonstrated. Initially, a thermoplastic composition was formed from 85.3 wt. % polylactic acid (PLA 6201D, Natureworks®), 9.5 wt. % of a microinclusion additive, 1.4 wt. % of a nanoinclusion additive, and 3.8 wt. % of an internal interfacial modifier. The microinclusion additive was Vistamaxx™ 2120 (ExxonMobil), which is a polypropylene-polyethylene copolymer elastomer with a melt flow rate of 29 g/10 min (190° C., 2160 g) and a density of 0.866 g/cm³. The nanoinclusion additive was poly(ethylene-co-methyl acrylate-co-glycidyl methacrylate) (Lotader® AX8900. Arkema) having a melt flow rate of 5-6 g/10 min (190° C./2160 g), a glycidyl methacrylate content of 7 to 11 methyl acrylate content of 13 to 17 wt. %, and ethylene content of 72 to 80 The internal interfacial modifier was PLURIOL® WI 285 Lubricant from BASF, which is a polyalkylene glycol functional fluid.

The polymers were fed into a co-rotating, twin-screw extrude (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The PLURIOL® Wl285 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then flood fed into a signal screw extruder heated to a temperature of 212° C. where the molten blend exited through 4.5 inch width slit die and drawn to a thickness ranging from 36 μm to 54 μm. The materials were stretched in the machine direction to about 100% to initiate cavitation and void formation.

Figure 5:
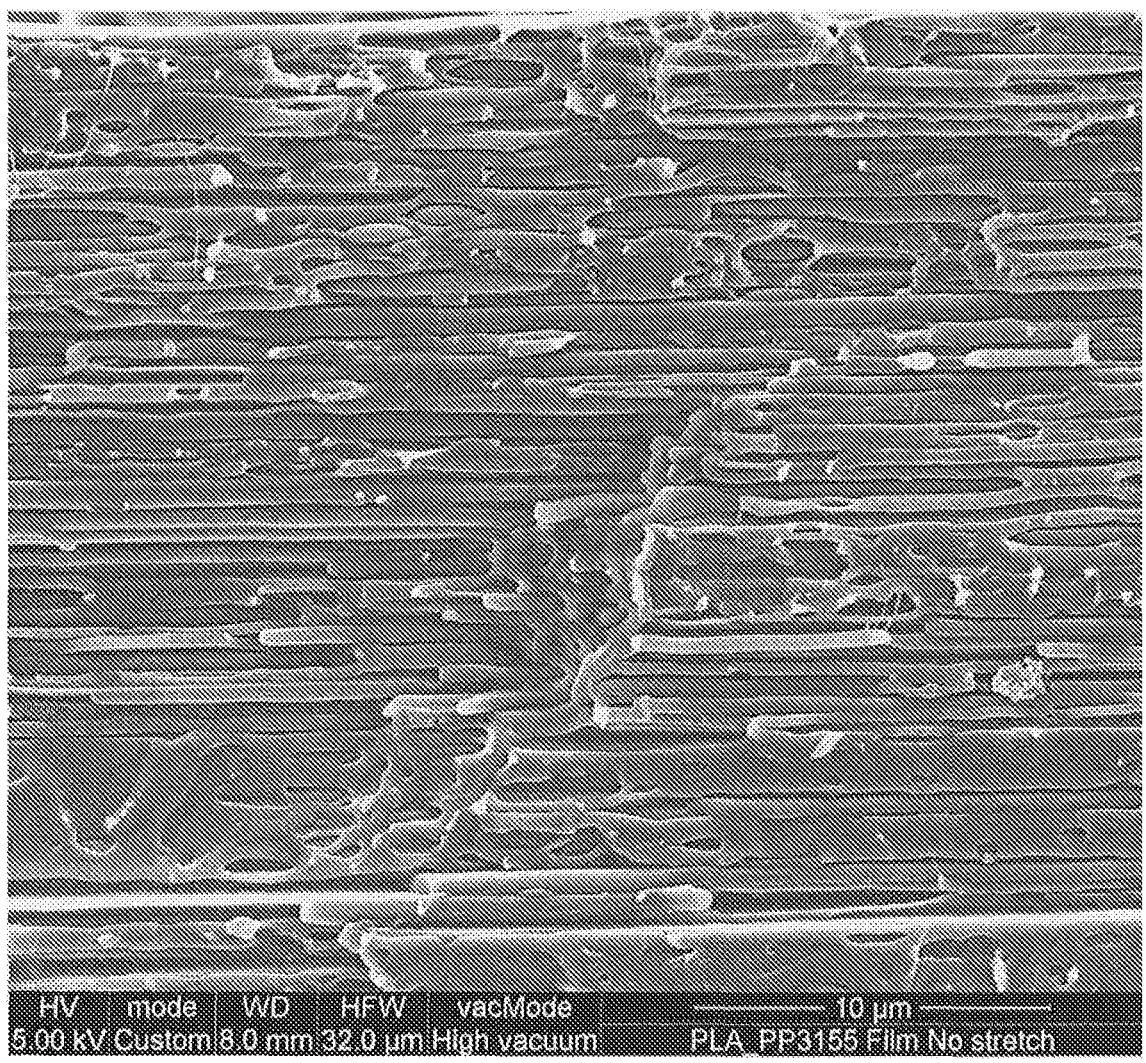
FIGS. 5-6 are SEM microphotographs of the unstretched material of Example 1, where the material was cut perpendicular to the machine direction in FIG. 5 and parallel to the machine direction in FIG. 6.
Figure 6:
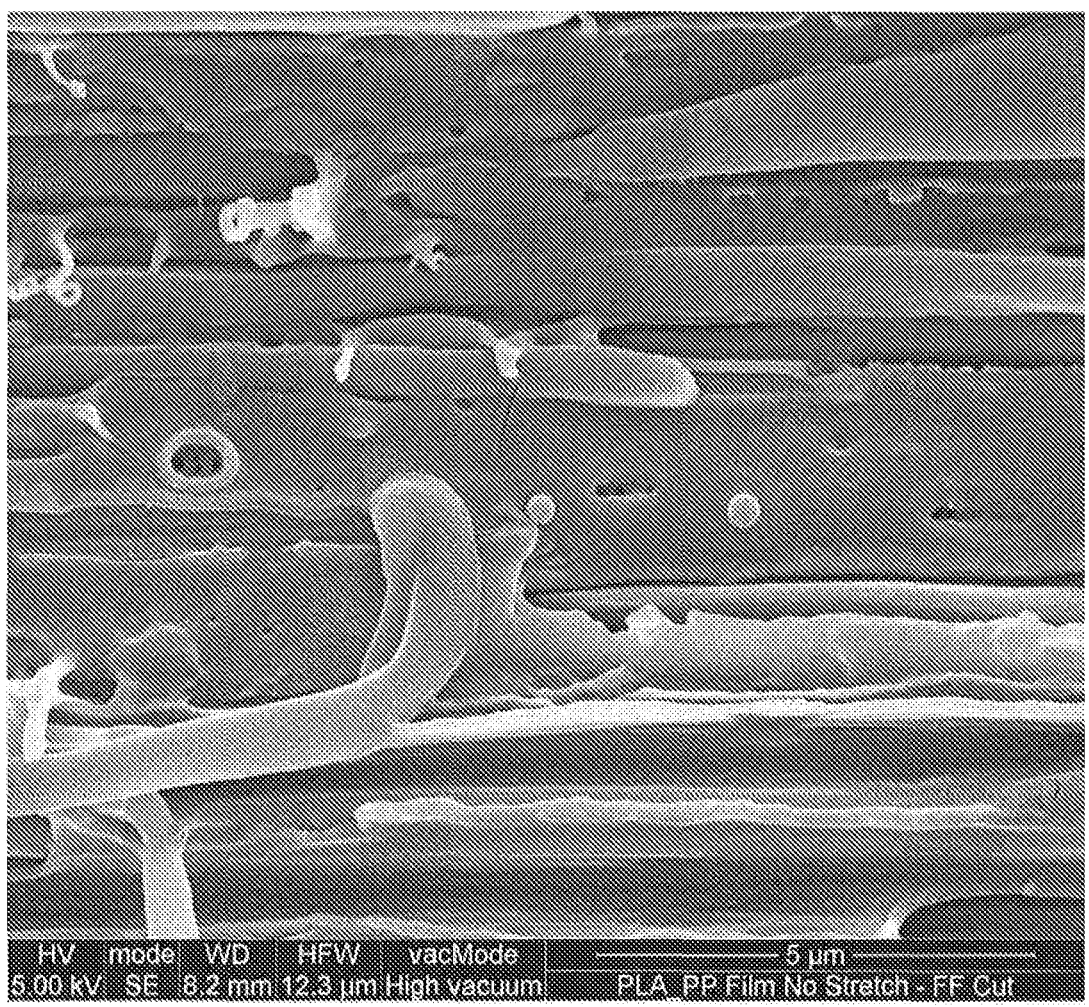
Figure 7:
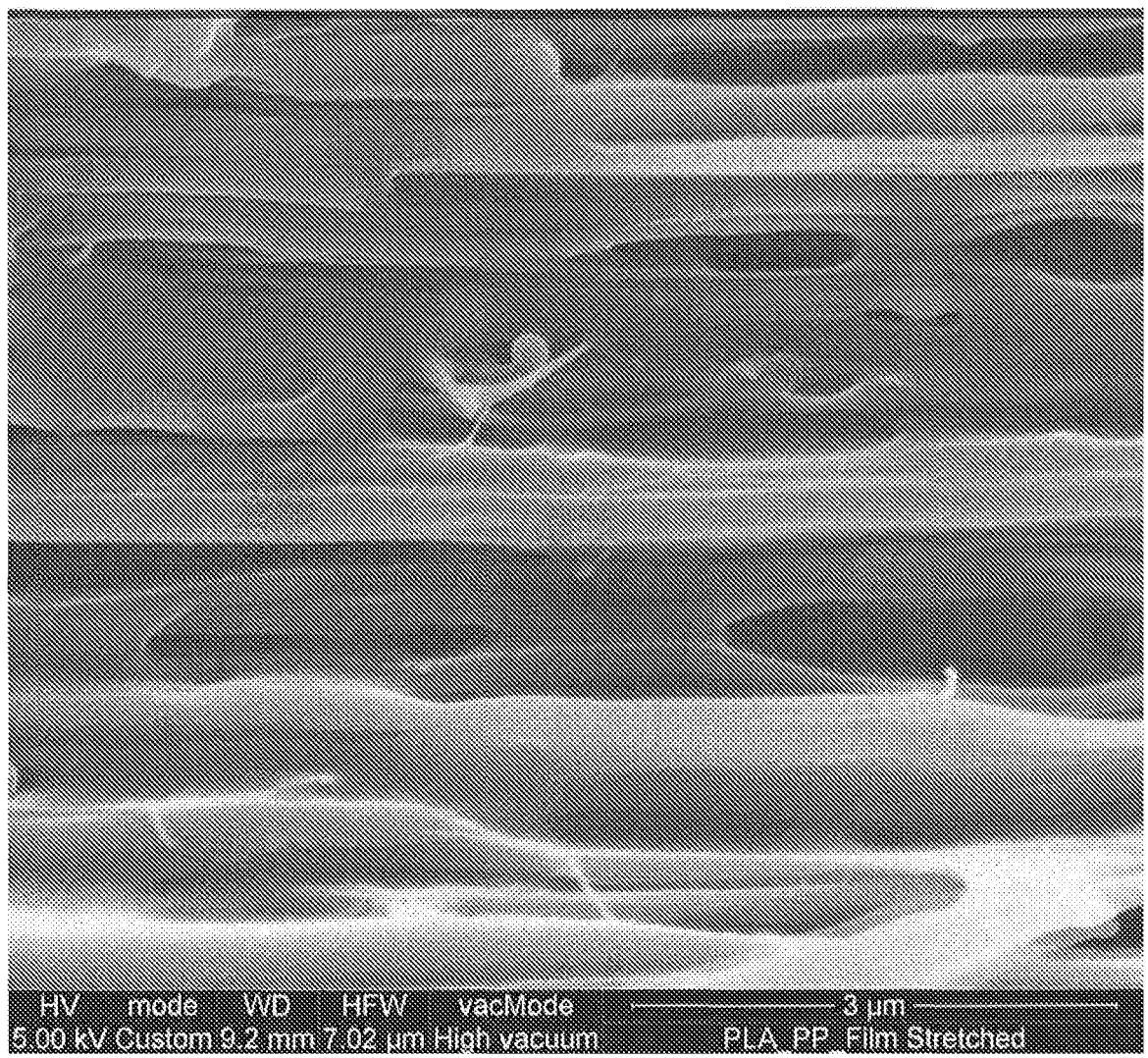
FIGS. 7-8 are SEM microphotographs of the stretched material of Example 1 (material was cut parallel to machine direction orientation).
Figure 8:
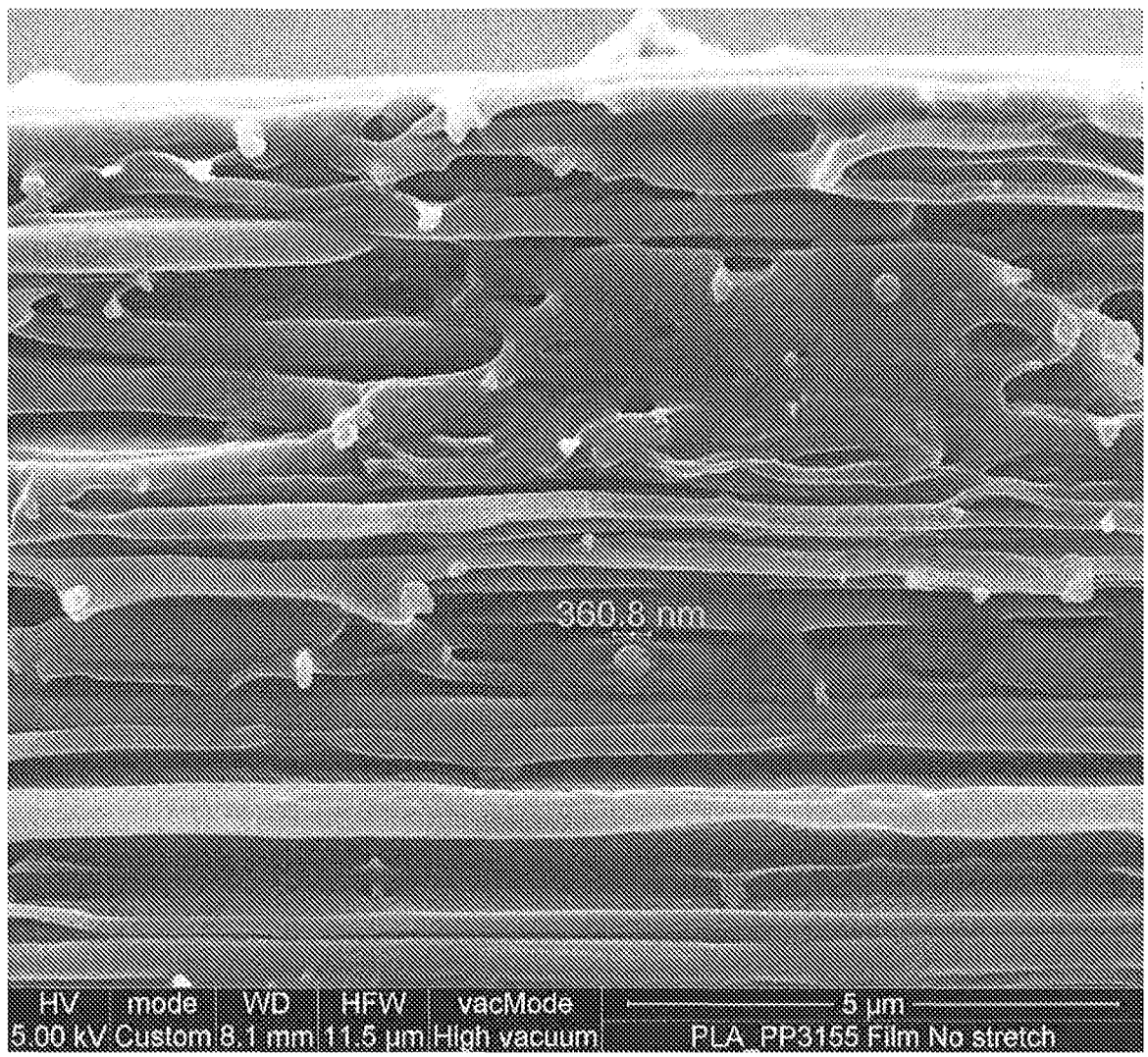

The morphology of the morphology was analyzed by scanning electron microscopy (SEM) before and after stretching. The results are shown in FIGS. 5-8. As shown in FIGS. 5-6, the microinclusion additive was initially dispersed in domains having an axial size (in machine direction) of from about 2 to about 30 micrometers and a transverse dimension (in cross-machine direction) of from about 1 to about 3 micrometers, while the nanoinclusion additive was initially dispersed as spherical or spheroidal domains having an axial size of from about 100 to about 300 nanometers. FIGS. 7-8 show the material after stretching. As indicated, pores formed around the inclusion additives. The micropores formed around the microinclusion additive generally had an elongated or slit-like shape with a broad size distribution ranging from about 2 to about 20 micrometers in the axial direction. The nanopores associated with the nanoinclusion additive generally had a size of from about 50 to about 500 nanometers.

EXAMPLE 2

The compounded pellets of Example 1 were dry blended with a third inclusion additive, which was a halloisite clay masterbatch (MacroComp MNH-731-36 MacroM) containing 22 wt. % of a styrenic copolymer modified nanoclay and 78 wt. % polypropylene (Exxon Mobil 315). The mixing ratio was 90 wt. % of the pellets and 10 wt. % of the clay masterbatch, which provided a total clay content of 2.2%. The dry blend was then flood fed into a signal screw extruder heated to a temperature of 212° C., where the molten blend exited through 4.5 inch width slit die and drawn to a thickness ranging from 51 to 58 μm. The materials were stretched in the machine direction to about 100% to initiate cavitation and void formation.

Figure 9:
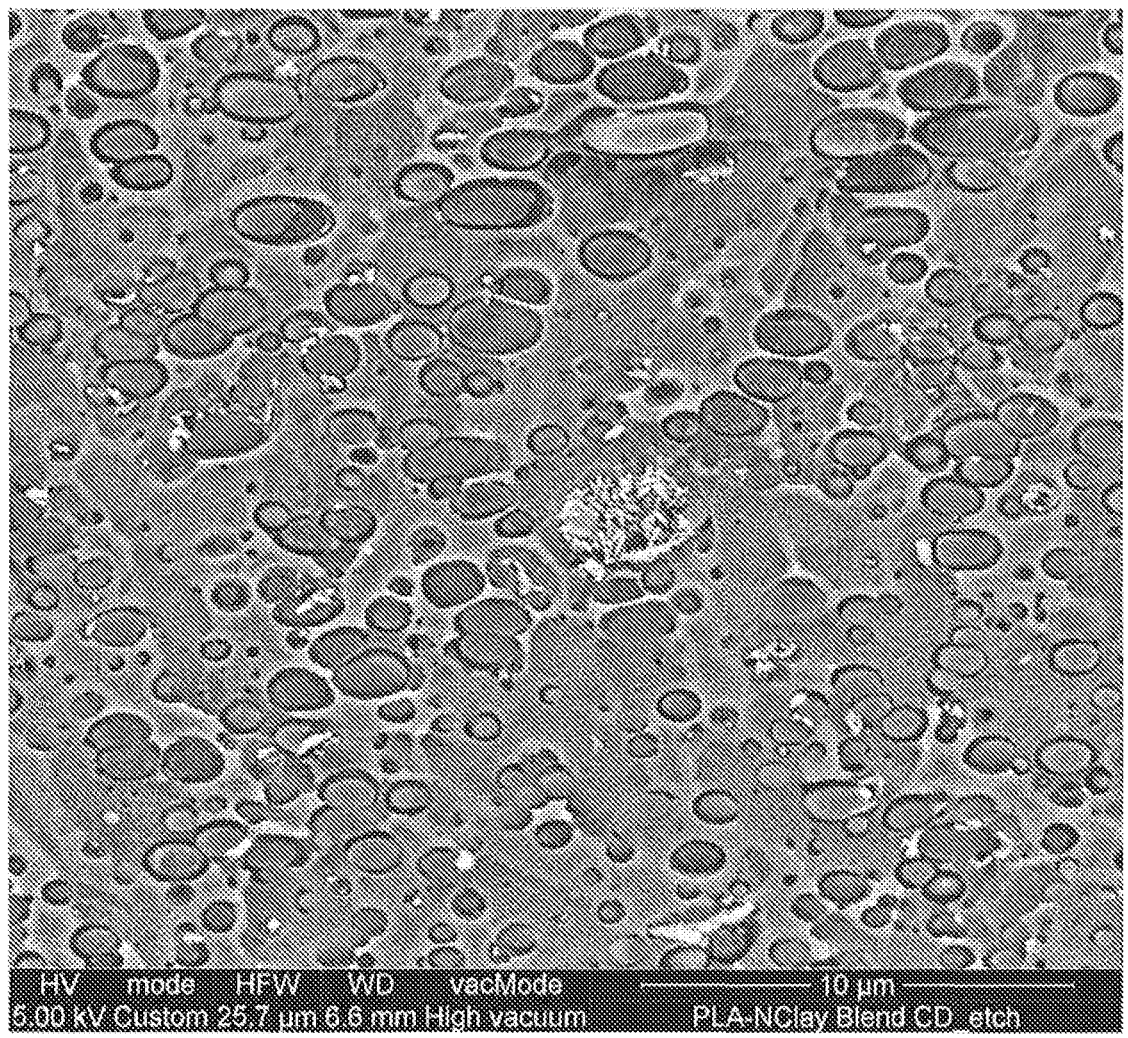
FIGS. 9-10 are SEM microphotographs of the unstretched material of Example 2, where the material was cut perpendicular to the machine direction in FIG. 9 and parallel to the machine direction in FIG. 10.
Figure 10:
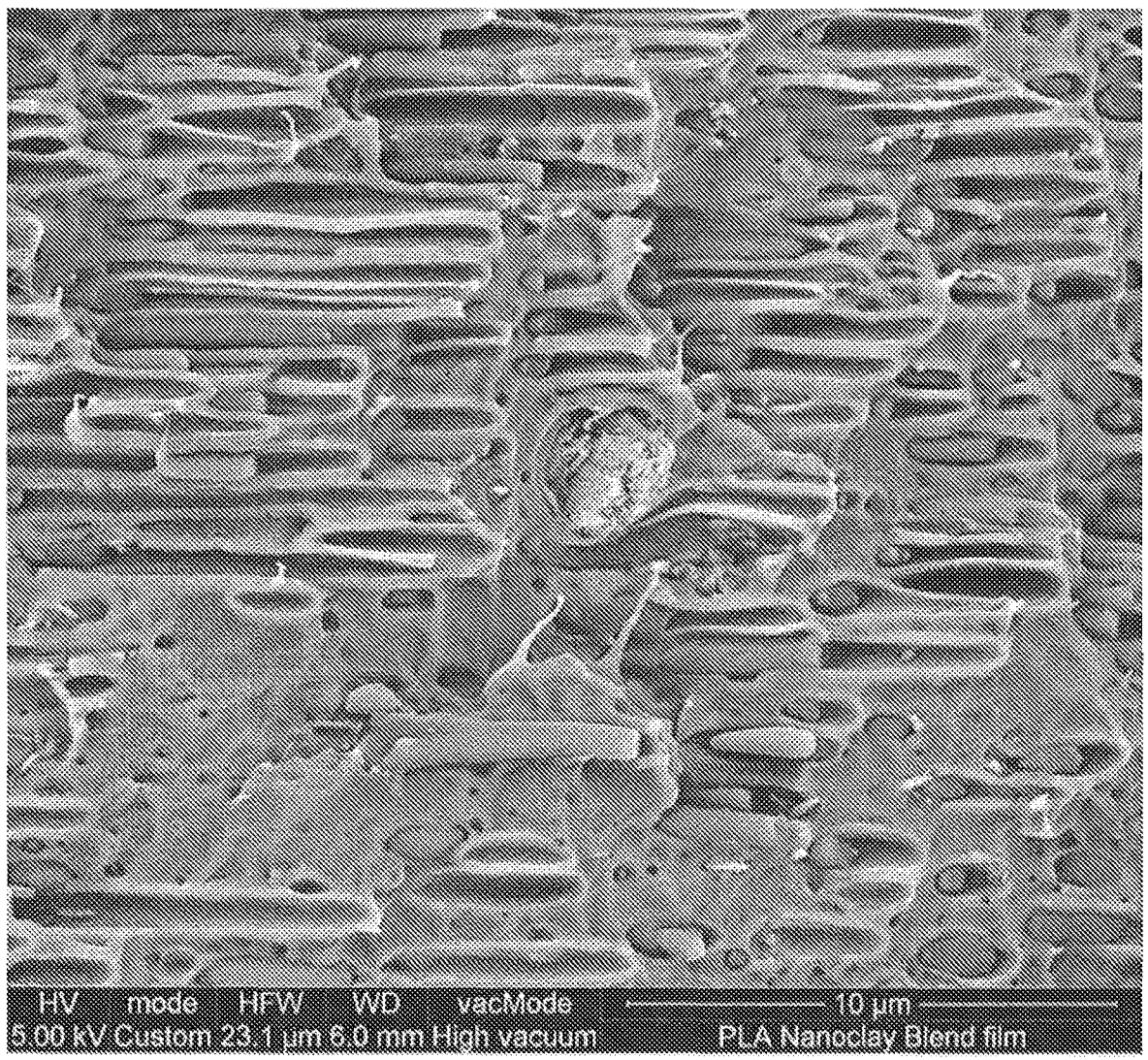
Figure 11:
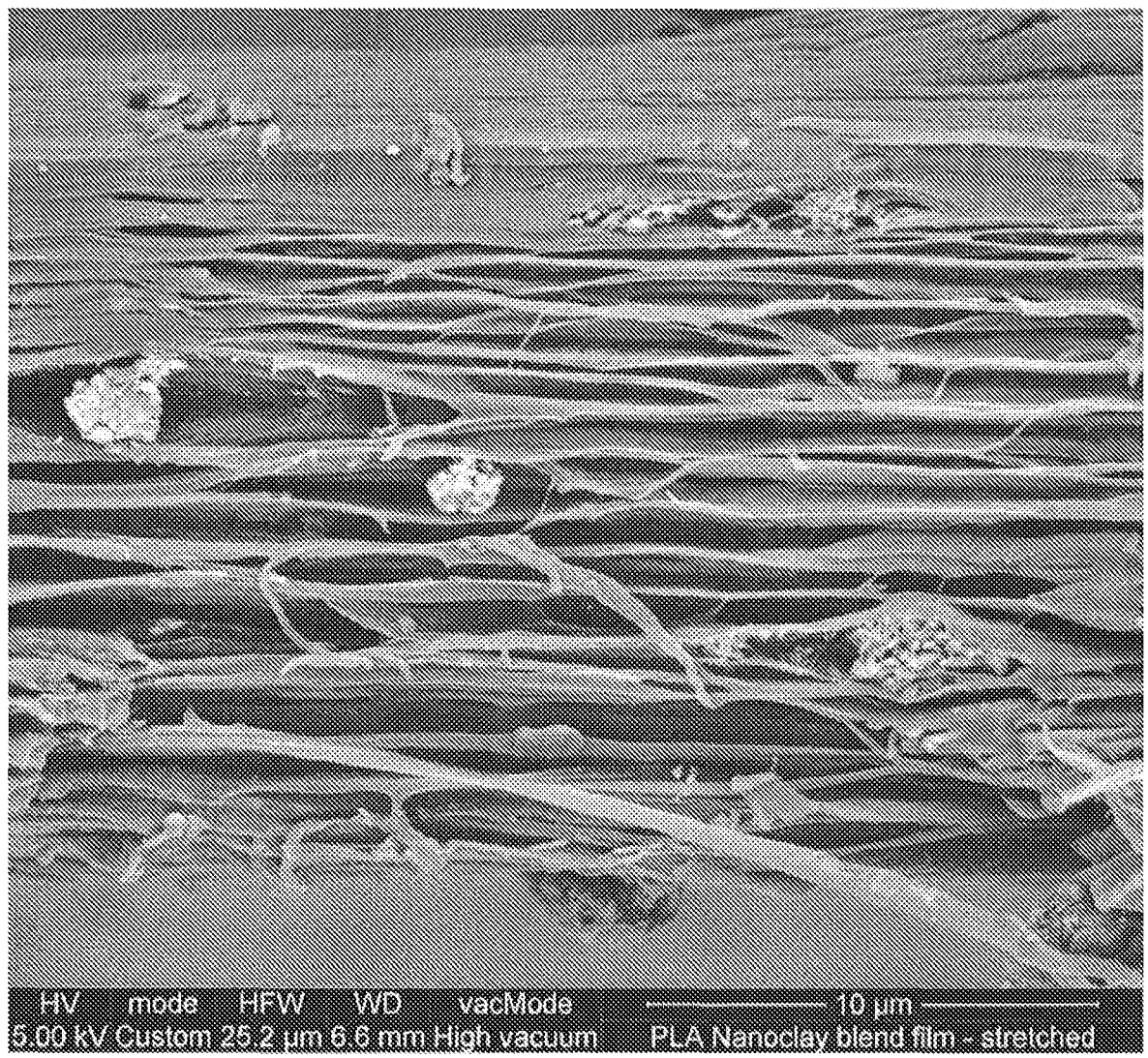
FIGS. 11-12 are SEM microphotographs of the stretched material of Example 2 (material was cut parallel to machine direction orientation).
Figure 12:
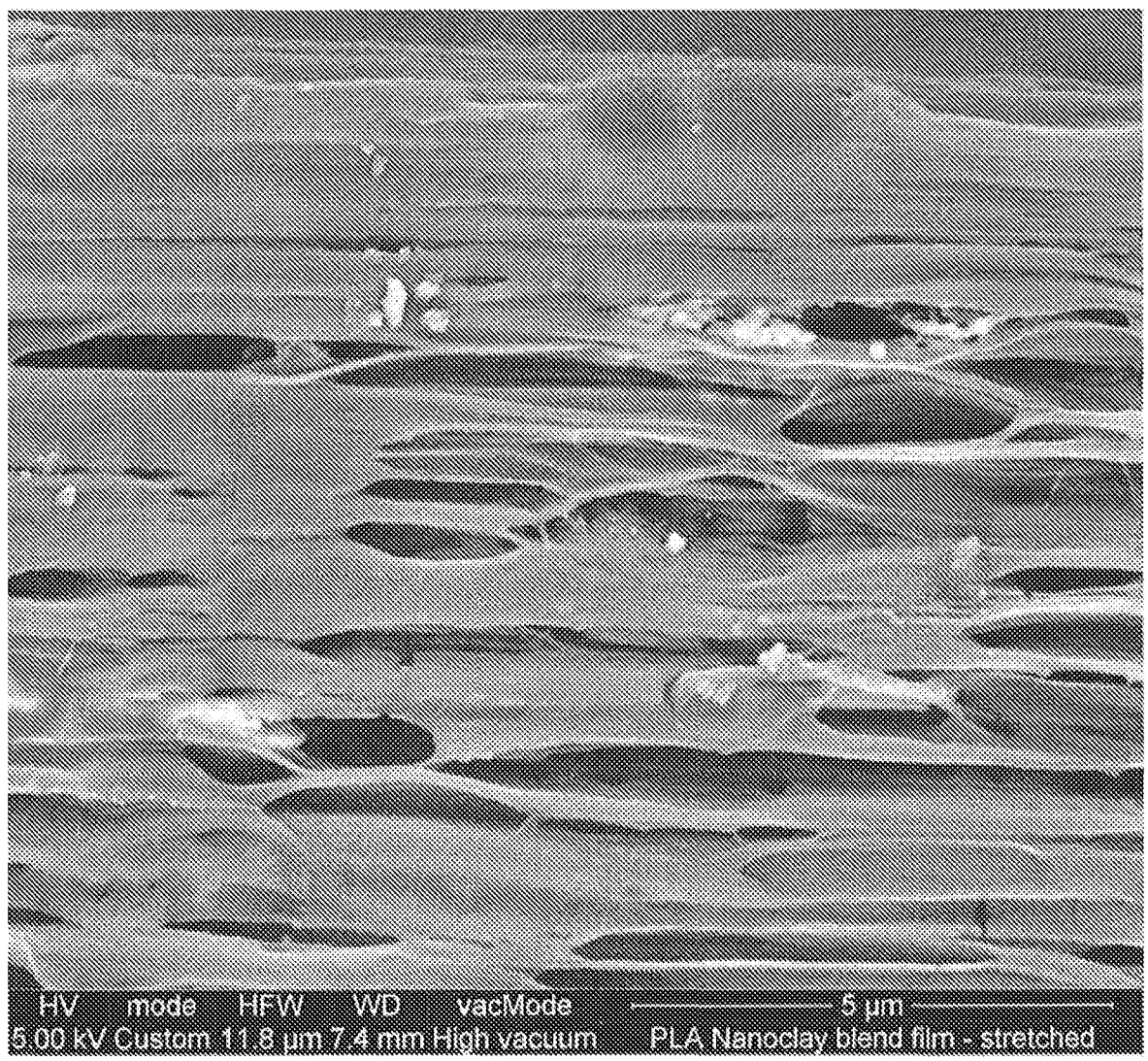

The morphology of the materials was analyzed by scanning electron microscopy (SEM) before and after stretching. The results are shown in FIGS. 9-12. As shown in FIGS. 9-10, some of the nanoclay particles (visable as brighter regions) became dispersed in the form of very small domains—i.e., axial dimension ranging from about 50 to about 300 nanometers. The masterbatch itself also formed domains of a micro-scale size (axial dimension of from about 1 to about 5 micrometers). Also, the microinclusion additive (Vistamax™) formed elongated domains, while the nanoinclusion additive (Lotadere®, visible as ultrafine dark dots) and the nanoclay masterbatch formed spheroidal domains. The stretched material is shown FIGS. 11-12. As shown, the voided structure is more open and demonstrates a broad variety of pore sizes. In addition to highly elongated micropores formed by the first inclusions (Vistamaxx™), the nanoclay masterbatch inclusions formed more open spheroidal micropores with an axial size of about 10 microns or less and a transverse size of about 2 microns. Spherical nanopores are also formed by the second inclusion additive (Lotader®) and third inclusion additive (nanoclay particles).

EXAMPLE 3

The ability to create a polymeric material having unique properties was demonstrated. Initially, a blend of 85.3 wt. % PLA 6201D, 9.5 wt. % of Vistamaxx™ 2120, 1.4 wt. % of Lotader® AX8900, and 3.8 wt. % of PLURIOL® WI 285 was formed. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The PLURIOL® WI285 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then flood fed into a signal screw extruder heated to a temperature of 212° C. where the molten blend exited through 4.5 inch width slit die and drawn to a thickness ranging from 0.54 to 0.58 mm.

EXAMPLE 4

Pellets were formed as described in Example 3 and then flood fed into a Rheomix 252 single screw extruder with a L/D ratio of 25:1 and heated to a temperature of 212° C. where the molten blend exited through a Haake 6 inch width cast film die and drawn to a thickness ranging from 39.4 μm to 50.8 μm via Haake take-up roll. The material was drawn in the machine direction to a longitudinal deformation of 160% at a pull rate of 50 mm/min (deformation rate of 67%/min) via MTS Synergie 200 tensile frame with grips at a gage length of 75 mm.

EXAMPLE 5

Materials were formed a described in Example 4, except that the material was also stretched in the cross-machine direction to a deformation of 100% at a pull rate of 50 mm/min (deformation rate of 100%/min) with grips at a gage length of 50 mm. Various properties of the materials of Examples 7-8 were tested as described above. The results are set forth below in the tables below.

| | Material Properties | | | |
|---|---|---|---|---|
| Ex. | Average Thickness (μm) | Expansion Ratio (φ) | Percent Void Volume (% $V_v$) | Density (g/cm³) |
| 4 | 41.4 | 1.82 | 45 | 0.65 |
| 5 | 34.0 | 2.13 | 53 | 0.56 |

Tensile Properties

| Example | | Avg. Thickness (µm) | Avg. Modulus (MPa) | Avg. Yield Stress (MPa) | Avg. Break Stress (MPa) | Avg. Strain at Break (%) | Avg. Energy per Volume at Break (J/cm$^3$) |
|---|---|---|---|---|---|---|---|
| 4 | MD | 44.5 | 466 | 41.4 | 36.9 | 54.6 | 16.8 |
|   | CD | 40.4 | 501 | 15.9 | 15.9 | 62.6 | 9.4 |
| 5 | MD | 37.3 | 265 | 26.7 | 26.3 | 85.5 | 15.8 |
|   | CD | 34.3 | 386 | 25.1 | 25.2 | 45.8 | 9.3 |

EXAMPLE 6

The compounded pellets of Example 1 were fed into a twin screw extruder (PRISM USALAB-16 from Thermo-Scientific) at 2 pounds per hour at a temperature of 200° C. The compound was extruded through a 3 mm diameter round die orifice and then necked down via melt drawing to form a filament having a nominal diameter of 1.75 mm. The filament was collected into a spool, which was then mounted into a Fused Deposition Method 3-D printer (CubeX Trio from 3-D systems). Prior to printing, a support (also known as a "raft") was created using a conventional polylactic acid material obtained from 3-D Systems. Various three-dimensional shapes were then printed using the spooled filaments, which included a circle having a height of 2 mm and diameter of 20 mm, a square having a height of 2 mm and length of 20 mm, and a tube having a height of 2 mm, an inner diameter of 16 mm, and an outer diameter of 20 mm. The printing temperature was controlled via the printer and ranged from 190° C. to 250° C. depending on the portion of the shape being printed. After printing, the shapes were stressed and bent by hand to initiate pore formation in the object.

EXAMPLE 7

Shapes were printed as described in Example 6, except that the filaments were stretched between two driven nip rolls to initiate pore formation prior to being loaded into the printer. During stretching, the diameter of the filament was maintained at 1.75 mm, but the length increased by 25%.

EXAMPLE 8

A rattle snake fang (cut in half along the traverse direction) was printed in the same manner as described in Example 6. In this example, an additional support structure was also printed using the filaments of Example 6.

While the invention has been described in detail with respect to the specific embodiment thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A printer cartridge for use in a three-dimensional printer system, wherein the printer cartridge contains
a spool; and
a polymeric material;
wherein the polymeric material is carried by the spool, wherein the polymeric material is formed from a thermoplastic composition containing a continuous phase that includes a matrix polymer comprising a polyester, a polyolefin, a styrenic polymer, or a combination thereof wherein the matrix polymer constitutes from about 60 wt. % to about 99 wt. % of the thermoplastic composition,
wherein a polymeric microinclusion additive and a polymeric nanoinclusion additive are dispersed within the continuous phase in the form of discrete domains wherein the microinclusion additive is present in the thermoplastic composition in an amount of from about 0.1 wt.% to about 30 wt.% and the nanoinclusion additive is present in the thermoplastic composition in an amount of from about 0.01 wt.% to about 15 wt.%; and further
wherein a porous network is defined in the polymeric material that includes a plurality of nanopores having an average cross-sectional dimension of about 800 nanometers or less, wherein the nanopores constitute about 20 vol.% or more of the total pore volume of the material.

2. The printer cartridge of claim 1, wherein the polymeric material is in the form of a filament.

3. The printer cartridge of claim 2, where the filament is wound around a rim of the spool.

4. The printer cartridge of claim 1, wherein the density of the polymeric material is about 1.2 g/cm$^3$ or less.

5. The printer cartridge of claim 1, wherein the modulus of elasticity of the polymeric material is about 2500 MPa or less.

6. The printer cartridge of claim 1, wherein the porous network further includes micropores.

7. The printer cartridge of claim 1, wherein the continuous phase constitutes from about 75 wt.% to about 98 wt.% of the thermoplastic composition.

8. The printer cartridge of claim 1, wherein the matrix polymer includes a polyester.

9. The printer cartridge of claim 1, wherein the ratio of the solubility parameter for the matrix polymer to the solubility parameter of the microinclusion additive is from about 0.5 to about 1.5, the ratio of the melt flow rate for the matrix polymer to the melt flow rate of the microinclusion additive is from about 0.2 to about 8, and/or the ratio of the Young's modulus elasticity of the matrix polymer to the Young's modulus of elasticity of the microinclusion additive is from about 1 to about 250.

10. The printer cartridge of claim 1, wherein the nanoinclusion additive is a polyepoxide.

11. The printer cartridge of claim 1, wherein the microinclusion additive constitutes from about 1 wt.% to about 30 wt.% of the composition, based on the weight of the continuous phase and/or the nanoinclusion additive constitutes from about 0.05 wt.% to about 20 wt.% of the composition, based on the weight of the continuous phase.

12. The printer cartridge of claim 1, wherein the thermoplastic composition further comprises an interphase modifier.

13. The printer cartridge of claim 1, wherein a generally cylindrical bore is defined within a central region of the spool.

14. The printer cartridge of claim 1, further comprising a housing structure that encloses the spool.

15. A system comprising a three-dimensional printer and the printer cartridge of claim 1.

16. The printer cartridge of claim 1, wherein the micro-inclusion additive is a polyolefin.

* * * * *